(12) United States Patent
Nakamura et al.

(10) Patent No.: US 7,052,790 B2
(45) Date of Patent: May 30, 2006

(54) FUEL CELL SYSTEM AND OPERATION METHOD HAVING A CONDENSED WATER TANK OPEN TO ATMOSPHERE

(75) Inventors: Akinari Nakamura, Katano (JP); Tatsuo Nakayama, Kyoto (JP); Tetsuya Ueda, Kasugai (JP); Masataka Ozeki, Izumi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 519 days.

(21) Appl. No.: 10/169,489

(22) PCT Filed: Oct. 18, 2001

(86) PCT No.: PCT/JP01/09133

§ 371 (c)(1),
(2), (4) Date: Nov. 12, 2002

(87) PCT Pub. No.: WO02/35632

PCT Pub. Date: May 2, 2002

(65) Prior Publication Data

US 2003/0129465 A1 Jul. 10, 2003

(30) Foreign Application Priority Data

Oct. 20, 2000 (JP) ............... 2000-320598
Nov. 2, 2000 (JP) ............... 2000-335482

(51) Int. Cl.
*H01M 8/04* (2006.01)
(52) U.S. Cl. .................. 429/26; 429/13; 429/22
(58) Field of Classification Search .................. 429/13, 429/22, 26, 34, 12

See application file for complete search history.

(56) References Cited

U.S. PATENT DOCUMENTS 5,980,716 A * 11/1999 Horinouchi et al. ........ 204/524
6,692,854 B1 * 2/2004 Misumi ........................ 429/26

FOREIGN PATENT DOCUMENTS

| JP | 04332478 A | * | 11/1992 |
| JP | 04-370665 | | 12/1992 |
| JP | 05054903 A | * | 3/1993 |
| JP | 10-003934 | | 1/1998 |

(Continued)

OTHER PUBLICATIONS

Japanese search report for PCT/JP01/09133 dated Feb. 19, 2002.

(Continued)

*Primary Examiner*—Gregg Cantelmo
(74) *Attorney, Agent, or Firm*—RatnerPrestia

(57) ABSTRACT

To avoid pressure variation in a cooling water channel, extend a life of an ion exchange resin used to maintain quality of cooling water and reduce power consumption by auxiliary machinery at low cost. There is provided a polymer electrolyte fuel cell, a cooling water tank, a cooling water channel, a cooling water pump, a heat exchanger, a fuel-side condenser and an oxidizer-side condenser that cool exhaust fuel gas and exhaust oxidizer gas discharged from the fuel cell to condense content water vapor, a condensed water tank that stores the water condensed in the fuel-side condenser and the oxidizer-side condenser, a water supply channel having a water supply pump for feeding the condensed water to the cooling water tank, and a water discharge channel for the cooling water tank.

20 Claims, 16 Drawing Sheets

FOREIGN PATENT DOCUMENTS

| | | |
|---|---|---|
| JP | 10-172598 | 6/1998 |
| JP | 10-235396 | 9/1998 |
| JP | 11-086895 | 3/1999 |
| JP | 11-283649 | 10/1999 |
| JP | 2000-208157 | 7/2000 |
| JP | 2001-035519 | 2/2001 |

OTHER PUBLICATIONS

English translation of Form PCT/ISA/210.

* cited by examiner

FUEL CELL SYSTEM AND OPERATION METHOD HAVING A CONDENSED WATER TANK OPEN TO ATMOSPHERE

This application is a U.S. National Phase application of PCT International application PCT/JP01/09133.

TECHNICAL FIELD

The present invention relates to a fuel cell system that uses a fuel cell to generate electric power, a method of operating the same and the like.

BACKGROUND ART

A conventional polymer electrolyte fuel cell system will be described below step-by-step.

First, FIG. 16 is a block diagram showing the conventional polymer electrolyte fuel cell system. A cooling water circulating system is provided, in which cooling pure water is supplied from a cooling water tank 2 to a polymer electrolyte fuel cell 1 through a cooling water channel 3 by means of a cooling water pump 4, and the cooling pure water having passed through the fuel cell 1 is cooled in a heat exchanger 5, such as a radiator, and then returns to the cooling water tank 2.

There is a problem in that conductive ions are eluted into the cooling pure water from the heat exchanger 5, which cools the cooling water, and the increased conductive ions cause short-circuit in the fuel cell 1, thereby reducing the amount of electric power generation. Thus, the conductive ions need to be removed from the cooling water, and to that end, an ion removal filter 6, which includes an ion exchange resin for removing the conductive ions eluted from the heat exchanger 5, is provided in the cooling water channel 3, the ion removal filter.

With the ion removal filter 6 provided in the cooling water channel 3, when the fuel cell 1 requires a large amount of water during high load operation, pressure loss of the cooling water is increased, therefore a bypass channel 7 is provided to reduce the pressure loss; and when a small amount of water during low load operation, that is not affected by the pressure loss in the ion removal filter 6, a flow control valve 8 is provided in the bypass channel 7, and the flow control valve enables the cooling pure water to be actively passed through the ion removal filter 6.

Although not shown, the water in the cooling water tank is reduced in the course of circulation, and thus, water needs to be supplied to the tank from outside. The supplied water may be water introduced from outside, such as tap water, or recycled water in the system.

As for the tap water, an element harmful to the human body is removed to a quite low concentration for the water to be suitable for drinking. However, for a hard water constituent, such as calcium and magnesium, and salinity, such as sodium and chlorine, which are not harmful to the human body, a significantly high concentration is permitted. Furthermore, for sterilization, sodium hypochlorite is added to the water in such a manner that the concentration thereof is equal to or higher than a certain value at the tap. Thus, the water is quite inferior in purity. Besides, in the case of water introduced from another source, such as ground water, a large quantity of organic acid or hard water constituent is contained therein. Thus, it is the same as the tap water in that it requires adequate purification.

On the other hand, the water recycled in the system is generated by reaction of hydrogen ($H_2$) and oxygen ($O_2$) in the fuel cell during electric power generation, so that a high purity can be attained in principle. However, in order to construct a practical system, some parts, such as a pipe and a valve, have to be made of metal in terms of safety or thermal efficiency, and it is difficult to entirely prevent metal ions from being eluted into the recycled water. Furthermore, the recycled water may be brought into contact with air, and carbon dioxide may be eluted therein to produce carbonate ions, thereby increasing the conductivity. Therefore, also in the case where the recycled water is used as the cooling water for a hydrogen generator or fuel cell, purification using the ion exchange resin or the like is needed.

Generally, the polymer electrolyte fuel cell system is operated with the cooling water at 70 to 80° C. circulated therein. Since the cooling water channel 3 of the polymer electrolyte fuel cell system shown in FIG. 16 is a closed type, when the system is operated, the temperature of the cooling water is changed from an ordinary temperature before operation to a high temperature during electric power generation, and accordingly, a pressure in the cooling water tank 2 and a pressure of the water in the cooling water channel 3 are increased. When the system operation is stopped, the temperature of the cooling water is changed from the high temperature during electric power generation to the ordinary temperature after operation, and accordingly, the pressure in the cooling water tank 2 and the pressure of the water in the cooling water channel 3 are decreased. Thus, there is a first problem in that the cooling water tank 2 and the cooling water channel 3 need to be constructed so as to withstand the pressure variation caused by the temperature variation.

Besides, since the ion removal filter 6 is provided in the cooling water channel 3, the increase of the flow rate of the cooling water results in the increase of the amount of the cooling water passing through the ion removal filter 6, whereby the pressure loss in the cooling water channel 3 is increased. In the conventional example, to avoid such a situation, the bypass channel 7 and the flow control valve 8 is used. However, there is a second problem in that the cost is increased by the increase in the number of components. To address this problem, the capability of the cooling water pump 4 may be enhanced. In this case, however, the cost as well as power consumption by auxiliary machinery for operating the system are increased, whereby the efficiency of the whole system is reduced. Thus, it cannot be said a sufficient solution.

In addition, there is a third problem as follows. Although most of the ion exchange resins (anion exchange resins, in particular) have a relatively low durable temperature, the temperature of the cooling water that cools the polymer electrolyte fuel cell 1 is about 70 to 80° C. Therefore, the ion exchange resin in the ion removal filter 6 provided in the cooling water channel 3 is thermally degraded due to long time operation under a strict condition in terms of the durable temperature, whereby the life thereof tends to be shortened. Furthermore, even if the quality of the cooling water is good, the cooling water at 70 to 80° C. flows. This is inefficient and further shortens the life of the ion exchange resin in the ion removal filter 6.

As described above, when the fuel cell system is to be put into practical use, water introduced from outside, which has an insufficient purity, has to be used. Therefore, the ion exchange resin is degraded rapidly, and a small device would have a shortened life and need frequent maintenance, and thus, the running cost thereof would be increased. In order to extend the life of the ion exchange resin, a method of pre-purifying the water by means of a reverse osmosis membrane provided in the preceding stage and then purifying the same water by means of the ion exchange resin is often used in ultra pure water production or the like. As disclosed in Japanese Patent Laid-Open No. 10-235396, there is also a purified water production apparatus for a fuel cell in which water is passed through the ion exchange resin after being purified to a certain degree through the reverse osmosis membrane. Here, the entire disclosure of the above-described Japanese Patent Laid-Open No. 10-235396 is incorporated herein by reference in its entirety.

Here, there is a fourth problem as follows. The reverse osmosis membrane is a membrane with micropores. While most of impurities cannot pass through the membrane, water molecule can pass through it. Therefore, water with a high purity exudes to the other side of the membrane. The impurities not passing through the membrane are continuously discharged in the form of condensed water. The higher the pressure of the water supplied, or the higher the temperature thereof, the larger amount of water can be purified. However, the amount of the condensed water discharged is also increased, and the running cost for the discharged water is increased accordingly. To eliminate the discharged water, another structure, for example, a channel to return the discharged water to the raw water for re-purification needs to be provided.

DISCLOSURE OF THE INVENTION

In consideration of the above-described first to third problems of the conventional polymer electrolyte fuel cell system, an object of the present invention is to provide a polymer electrolyte fuel cell system having a simple construction with low cost and a high efficiency to attain a long life of an ion exchange resin used to maintain quality of cooling water, and a method of operating the same.

Furthermore, this invention solves the fourth problem of water processing in the above-described conventional fuel cell system, and when a reverse osmosis membrane device is used for purification to extend the life of the ion exchange resin or reduce the usage thereof, it reduces discharged condensed water, thereby reducing the running cost.

To achieve the above object, one aspect of the present invention is a fuel cell system, comprising:

a fuel cell that generates electric power using a fuel gas and an oxidizer gas;

a cooling water tank that stores cooling water for cooling said fuel cell;

fuel-side condenser means of cooling an exhaust fuel gas discharged from said fuel cell to condense content water vapor, thereby providing condensed water and/or oxidizer-side condenser means of cooling an exhaust oxidizer gas discharged from said fuel cell to condense content water vapor, thereby providing condensed water;

a condensed water tank that is opened to atmosphere and stores said condensed water provided by said fuel-side condenser means and/or said oxidizer-side condenser means; and an atmosphere communicating channel that interconnects a space in said cooling water tank and a space in said condensed water tank.

Another aspect of the present is the fuel cell system, comprising:

a water supply channel including water supply means of supplying water from said condensed water tank to said cooling water tank and water quality treatment means of adjusting the quality of the water supplied to said cooling water tank; and controller means of controlling at least an operation of said water supply means, and the water adjusted in quality by said water quality treatment means is supplied to said cooling water tank from said condensed water tank.

Still another aspect of the present invention is the fuel cell, wherein said controller means activates said water supply means when starting and/or terminating the operation of the fuel cell system.

Yet still another aspect of the present invention is the fuel cell system, wherein said controller means includes:

number-of-operations storage means of counting and storing a number of operations of the fuel cell system; and number-of-operations resetting means of resetting said stored number of operations to an initial condition, and said water supply means is activated when said number of operations stored in said number-of-operations storage means becomes larger than a certain number, and after the operation of said water supply means is terminated, said number of operations is reset by said number-of-operations resetting means.

Still yet another aspect of the present invention is the fuel cell system, wherein said controller means includes:

operation time storage means of counting and storing an operation time of the fuel cell system; and operation time resetting means of resetting said stored operation time to an initial condition, and said water supply means is activated when said operation time stored in said operation time storage means becomes larger than a certain time, and after the operation of said water supply means is terminated, said operation time is reset by said operation time resetting means.

A further aspect of the present invention is the fuel cell system, wherein said controller means includes water quality detecting means of detecting the quality of said cooling water, and said water supply means is activated when said water quality becomes worse than a predetermined first reference value, and said water supply means is stopped when said water quality becomes better than a predetermined second reference value during operation of said water supply means.

A still further aspect of the present invention is the fuel cell system, wherein an ion exchange resin is used as said water quality treatment means.

A yet further aspect of the present invention is the fuel cell system, comprising:

a hot water reservoir that has a hot water circulation channel, through which hot water intended for heat exchange with said cooling water circulates, and stores said hot water; and a reverse osmosis membrane device.

A still yet further aspect of the present invention is the fuel cell system, wherein said reverse osmosis membrane device receives city water, separates the city water into purified water and condensed water, supplies said condended water to said hot water reservoir, and supplies said purified water to said condensed water tank or said cooling water tank.

An additional aspect of the present invention is the fuel cell system, wherein said reverse osmosis membrane device receives said hot water from said hot water reservoir, separates the hot water into purified water and condended water, returns said condensed water to said hot water reservoir, and supplied said purified water to said condensed water tank or said cooling water tank.

A still additional aspect of the present invention is the fuel cell system, comprising:

a bypass channel that directly interconnects an inlet port and a discharge port for said condensed water of said reverse osmosis membrane device; and a reverse osmosis membrane inlet-side channel control valve and/or a condensed water discharge-side channel control valve, the reverse osmosis membrane inlet-side channel control valve being provided at a branch point of the inlet port of said reverse osmosis membrane device and said bypass channel or at a position closer to said inlet port than the branch point, and the condensed water discharge-side channel control valve being provided at a branch point of said discharge port for the condensed water of said reverse osmosis membrane device and said bypass channel or at a position closer to said discharge port than the branch point, wherein said controller controls the reverse osmosis membrane inlet-side channel control valve and/or said condensed water discharge-side channel control valve to pass whole or part of the water passing through the said reverse osmosis layer device through said bypass channel.

A yet additional aspect of the present invention is the fuel cell, comprising: temperature detecting means of measuring the temperature of the water supplied to said reverse osmosis membrane device, wherein said controller controls to adjust a ratio of waters supplied to said bypass channel and said reverse osmosis membrane device based on the temperature measured with said temperature detecting means.

A supplementary aspect of the present invention is the fuel cell, comprising water amount measuring means of measuring the amount of water stored in said condensed water tank.

A still supplementary aspect of the present invention is the fuel cell, comprising flow rate measuring means of measuring the amount of water supplied from said condensed water tank to a reformer that supplies the fuel gas to said fuel cell.

A yet supplementary aspect of the present invention is the fuel cell system, comprising:

amount-of-electric-power-generation measuring means of measuring the amount of electric power generated by said fuel cell; and amount-of-collected-water estimating means of estimating, based on the detection value of said amount-of-electric-power-generation measuring means, the amount of condensed water collected in said fuel-side condenser means and/or said oxidizer-side condenser means.

A still yet supplementary aspect of the present invention is the fuel cell, wherein said hot water reservoir has a discharge valve that discharges said hot water when the water purified in said reverse osmosis membrane device becomes insufficient.

Another aspect of the present is a method of operating a fuel cell system comprising:

a fuel cell that generates electric power using a fuel gas and an oxidizer gas;

a cooling water tank that stores cooling water for cooling said fuel cell;

fuel-side condenser means of cooling an exhaust fuel gas discharged from said fuel cell to condense content water vapor, thereby providing condensed water and/or oxidizer-side condenser means of cooling an exhaust oxidizer gas discharged from said fuel cell to condense content water vapor, thereby providing condensed water;

a condensed water tank that is opened to atmosphere and stores said condensed water provided by said fuel-side condenser means and/or said oxidizer-side condenser means; and an atmosphere communicating channel that interconnects a space in said cooling water tank and a space in said condensed water tank, wherein the method comprises the steps of:

generating electric power in said fuel cell using said fuel gas and said oxidizer gas;

cooling said fuel cell with the cooling water in said cooling water tank;

with said fuel-side condenser means and/or oxidizer-side condenser means, providing condensed water by cooling the exhaust fuel gas and/or said exhaust oxidizer gas discharged from said fuel cell to condense the content water vapor; and storing said condensed water in said condensed water tank, and atmospheric pressure in said condensed water tank accommodates pressure variation in said cooling water tank.

Still another aspect of the present invention is the method of operating a fuel cell system, wherein said fuel cell system comprises:

a water supply channel including water supply means of supplying water from said condensed water tank to said cooling water tank and water quality treatment means of adjusting the quality of the water supplied to said cooling water tank, and the method comprises a step of supplying the water adjusted in quality by said water quality treatment means to said cooling water tank from said condensed water tank.

Yet another aspect of the present invention is the method of operating a fuel cell system, wherein said fuel cell system comprises a hot water reservoir having a hot water circulation channel intended for heat exchange with said cooling water and a reverse osmosis membrane device, and the method comprises the steps of:

supplying purified water to said cooling water tank and/or said condensed water tank through said reverse osmosis device; and supplying the condensed water dischanged from said reverse osmosis device to said hot water reservoir.

Figure 1:
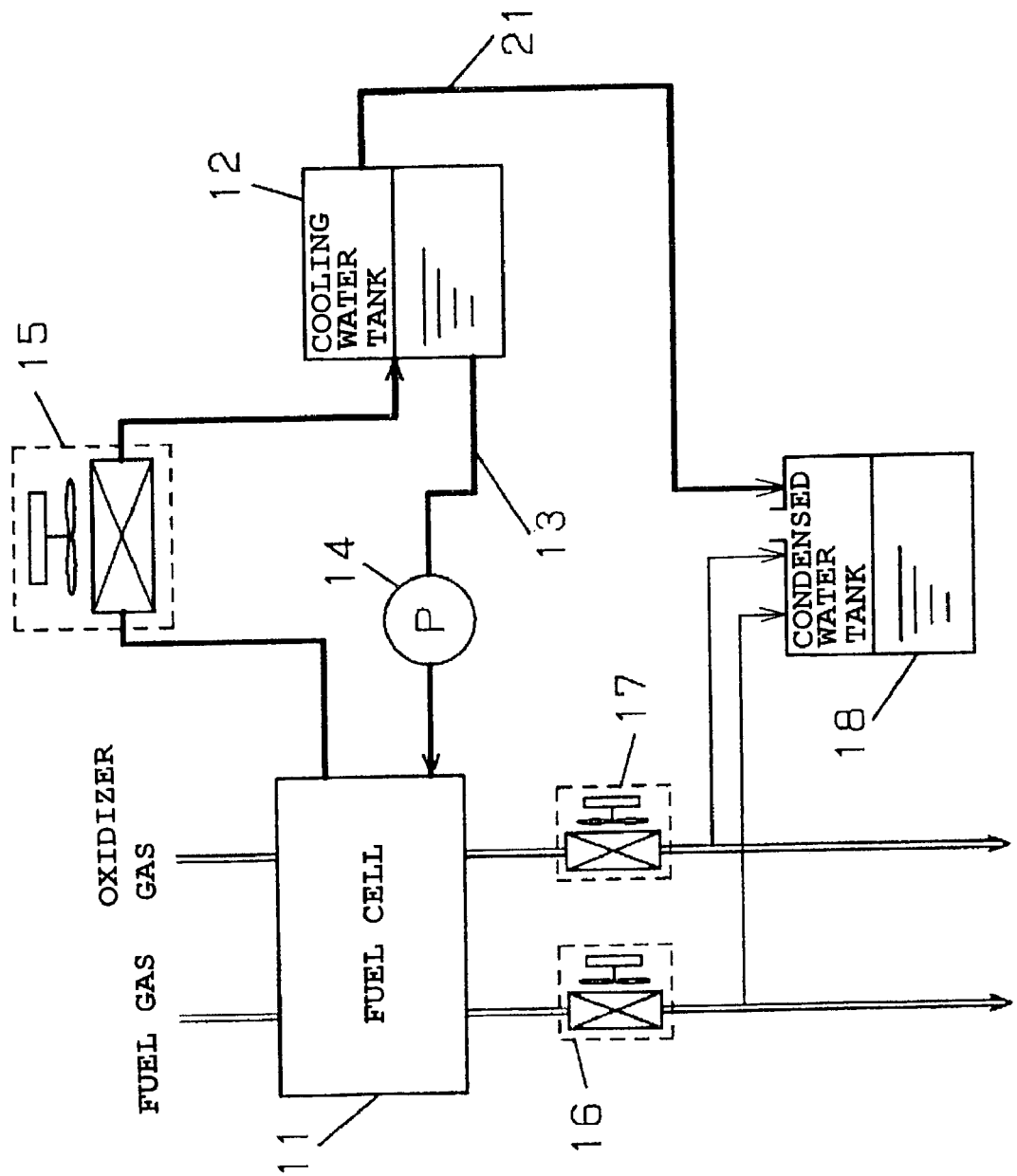
FIG. 1 is a block diagram showing a polymer electrolyte fuel cell system according to a first embodiment of this invention.

DESCRIPTION OF REFERENCE NUMERALS 11 fuel cell
12 cooling water tank
13 cooling water channel
14 cooling water pump
15 heat exchanger
22, 47 ion removal filter
16 fuel-side condenser
17 oxidizer-side condenser
18 condensed water tank
19 water supply pump
20 water supply channel
21 water discharge channel
23, 26, 30, 31 controller
24 number-of-operations storage means
25 number-of-operations resetting means
27 operation time storage means
28 operation time resetting means
29 water quality monitor
41 reformer
42 combustion section
43 hot water reservoir
44 reverse osmosis membrane device
45 hot water supply channel
46 hot water circulation channel
51, 59 level sensor
52 drain valve
53 condenser
58 booster pump
54 reverse osmosis membrane inlet-side channel switching valve
55 condensed water outlet-side channel switching valve
56 bypass channel
57 temperature sensor
60 flow ratio control valve
61 flow meter
62 amount-of-electric-power-generation-controlling section
63 current measuring section
64 amount-of-collected-water-estimating means
101 electrolyte
102 fuel electrode
103 air electrode
104a hydrogen-side catalyst layer
104b air-side catalyst layer

BEST MODE FOR CARRYING OUT THE INVENTION

Now, embodiments of this invention will be described with reference to drawings.

(First Embodiment)

FIG. 1 is a block diagram showing a polymer electrolyte fuel cell system according to a first embodiment of this invention. The polymer electrolyte fuel cell system comprises a polymer electrolyte fuel cell 11 for generating electric power using a fuel gas and an oxidizing gas, a cooling water tank 12 for storing cooling water for cooling the fuel cell 11, a cooling water channel 13 for circulating the cooling water, a cooling water pump 14 serving as means of making the cooling water circulate through the cooling water channel 13, a heat exchanger 15 for cooling the cooling water, a fuel-side condenser 16 for cooling the exhaust fuel gas discharged from the fuel cell 11 to condense water vapor contained therein, an oxidizer-side condenser 17 for cooling the exhaust oxidizer gas discharged from the fuel cell 11 to condense water vapor contained therein, a condensed water tank 18 opened to the atmosphere for storing the water condensed in the fuel-side condenser 16 and the oxidizer-side condenser 17, and a water discharge channel 21 for discharging excessive cooling water in the cooling water tank 12. The water discharge channel 21 may be provided on a ceiling surface or side surface of the cooling water tank. However, desirably, the channel is provided on an upper part of the cooling water tank. More desirably, the channel is provided to be higher than the water surface of the cooling water tank 12 when the system is in operation.

Here, the water discharge channel 21 also serves as an atmosphere communicating channel in this invention.

Now, operation of the polymer electrolyte fuel cell system in this embodiment will be described.

The fuel gas and the oxidizing gas supplied to the fuel cell 11 are those adjusted in temperature and humidity. The fuel gas used may be hydrogen gas, or a hydrogen-rich gas obtained by steam reforming a hydrocarbon gas, such as methane. The oxidizing gas used may be oxygen gas or a gas containing oxygen, such as air.

The electrochemical reaction in the fuel cell 11 consumes the hydrogen in the fuel gas and the oxygen in the oxidizing gas to generate water on the side of the oxidizing gas. The oxidizing gas discharged from the fuel cell 11 is introduced into the oxidizer-side condenser 17, where the temperature thereof is decreased through heat exchange with outside air and the water vapor in the discharged oxidizer gas is condensed into water, which is to be collected in the condensed water tank 18. On the other hand, the exhaust fuel gas discharged from the fuel cell 11 is introduced into the fuel-side condenser 16, where the temperature thereof is decreased through heat exchange with outside air and the water vapor in the exhaust fuel gas is condensed into water, which is to be collected in the condensed water tank 18.

In order to keep the fuel cell generating electric power at a constant temperature equal to or higher than 70° C., the water is circulated through the cooling water channel 13 by means of the cooling water pump 14, and the heat generated in the fuel cell 11 is emitted to the outside by means of the heat exchanger 15. Since a gas existing in the upper space in the cooling water tank 12 is communicated via the water discharge channel 21 with the condensed water tank 18, which is opened to the atmosphere, an internal pressure of the cooling water tank 12 is always identical to that attained when the tank is opened to the atmosphere.

With the arrangement of the polymer electrolyte fuel cell system according to this embodiment, the internal pressure of the cooling water tank 12 is always identical to that attained when the tank is opened to the atmosphere. Therefore, when the temperature of the cooling water is raised from an ordinary temperature before system operation to a high temperature during electric power generation, the gas existing in the upper space in the cooling water tank 12 is expanded due to the temperature rise, and the cooling water is evaporated according to the saturated water vapor pressure for the temperature at that time. That is, the gas existing in the upper space in the cooling water tank 12 becomes an wet gas containing the saturated water vapor. Here, the internal pressure of the cooling water tank 12 is always identical to that attained when the tank is opened to the atmosphere. The wet gas is introduced into the condensed water tank 18 through the water discharge channel 21 while emitting heat to the outside. The water in the condensed water tank 18 is generally kept at a temperature equal to or lower than 40° C., and thus, the gas in the condensed water tank contains the saturated water vapor with a temperature equal to or lower than 40° C. Accordingly, the wet gas from the cooling water tank 12 is cooled to about 40° C. through the water discharge channel 21 and the condensed water tank 18, and the water vapor corresponding to supersaturation is condensed into water and collected in the condensed tank 18.

During steady operation, the inside of the cooling water tank is kept at a constant temperature equal to or higher than 70° C. Therefore, the gas in the upper space in the cooling water tank 12 is not changed in volume, and the cooling water is hardly evaporated. When the system operation is stopped, the temperature of the cooling water is changed from the high temperature during electric power generation to the ordinary temperature after operation, whereby the gas in the cooling water tank 12 is reduced in volume, and the water vapor is condensed. At this time, the gas corresponding to the volume reduction flows from the condensed water tank 18, which is opened to the atmosphere, into the cooling water tank 12 via the water discharge channel 21. Thus, also when the system is at rest, the internal pressure of the cooling water tank 12 is always identical to that attained when the tank is opened to the atmosphere.

That is, with the arrangement of the polymer electrolyte fuel cell system illustrated in this embodiment, the internal pressure of the cooling water tank 12 can always be kept identical to that attained when the tank is opened to the atmosphere, and the cooling water tank 12 and the cooling water channel 13 need not have structures capable of withstanding the pressure variation.

While in this embodiment, both the fuel-side condenser 16 and the oxidizer-side condenser 17 are provided, only one of the fuel-side condenser 16 and the oxidizer-side condenser 17 may be provided to achieve the same effect.

While in this embodiment, the fuel-side condenser 16 and the oxidizer-side condenser 17 are air-cooled heat exchangers that conduct heat exchange with the outside air, a water-cooled heat exchanger that conducts heat exchange with water may be used to achieve the same effect.

In addition, the water in the condensed water tank 18 may be supplied to the cooling water tank 12.

(Second Embodiment)

Figure 2:
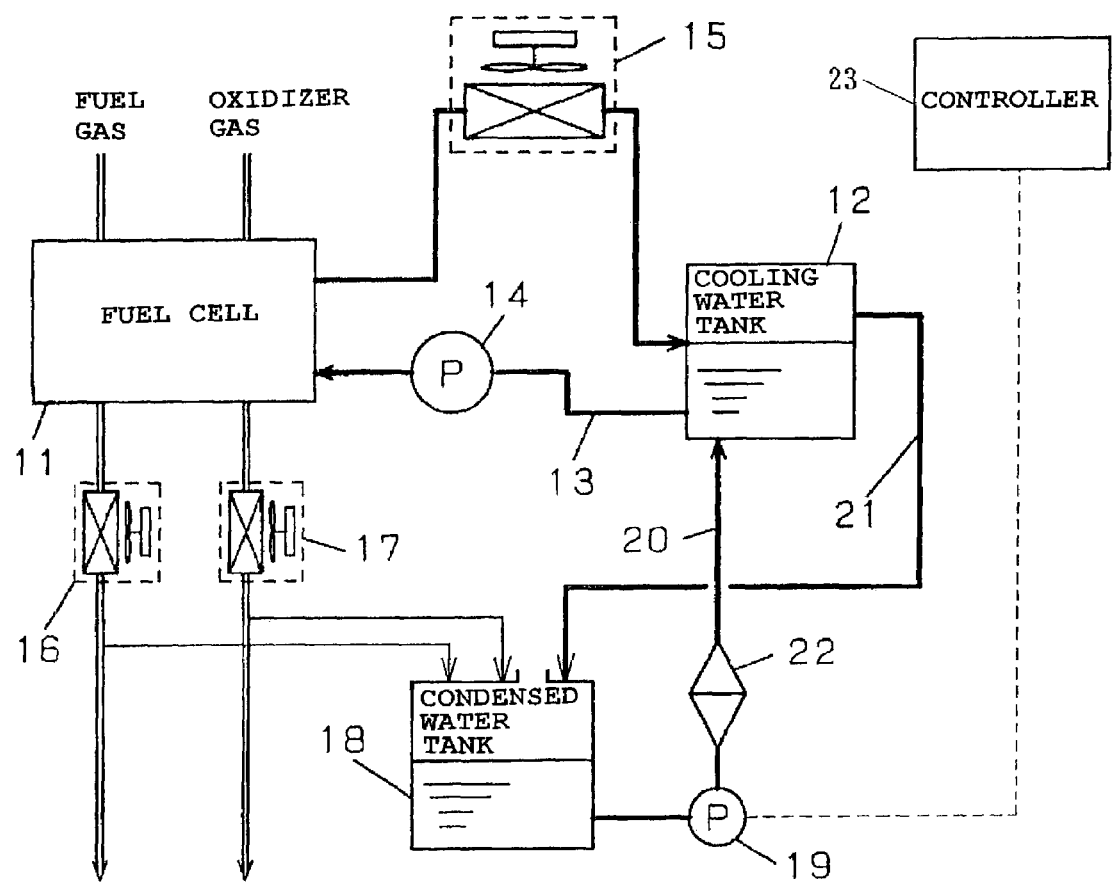
FIG. 2 is a block diagram showing a polymer electrolyte fuel cell system according to a second embodiment of this invention.

FIG. 2 is a block diagram showing a polymer electrolyte fuel cell system according to a second embodiment of this invention. Members identical to those in FIG. 1 and having the same functions as in FIG. 1 are given the same reference numerals, and description thereof will be omitted.

This embodiment is different from the first embodiment in that there are provided a water supply channel 20, which is provided with an ion removal filter 22 and a water supply pump 19 for feeding the condensed water from the condensed water tank 18 to the cooling water tank 12, and a controller 23 for controlling activation of the water supply pump 19. The ion removal filter 22 serves as means of treating water quality.

Now, the operation will be described. When the cooling water in the cooling water tank 12 is decreased, the water supply pump 19 in the water supply channel 20 is activated under the control of the controller 23, thereby supplying the water in the condensed water tank 18 to the cooling water tank 12. At this time, even if the water is excessively supplied to the cooling water tank 12, the excessive cooling water is discharged through the water discharge channel 21 to the condensed water tank 18, so that a space is provided in the cooling water tank 12 and the inside thereof is not completely filled with water.

Here, the ion removal filter 22 is to remove ions contained in the water in the cooling water tank 12 by means of an ion exchange resin, and thus, adjusts the quality of the water supplied to the cooling water tank 12.

With the arrangement of the polymer electrolyte fuel cell system shown in this embodiment, besides the actions described in the first embodiment, water can be supplied to the cooling water tank 12 to prevent the water therein from being decreased and the quality of the supplied water can be adjusted in continuous operation. In addition, since the temperature of the condensed water is of the order of 40° C., the ion exchange resin can be used at a temperature equal to or lower than the durable temperature, and therefore, the thermal degradation of the ion exchange resin can be prevented.

In addition, with the arrangement of the polymer electrolyte fuel cell system shown in this embodiment, the following operation can be realized.

When the cooling water in the cooling water tank 12 is not decreased, the water supply pump 19 is activated. Then, water, which is adjusted in quality through the ion removal filter 22 in the water supply channel 20, is supplied to the cooling water tank 12. Excessive cooling water in response to this, is discharged through the water discharge channel 21 and collected in the condensed water tank 18. The water supplied to the cooling water tank 12 has better quality than the discharged water. Thus, the quality of the cooling water can be improved.

While the cooling water collected in the condensed water tank 18 has a high temperature equal to or higher than 70° C., the condensed water condensed for collection in the fuel-side condenser 16 and the oxidizer-side condenser 17 has a temperature of the order of 40° C. Therefore, the temperature of the water passing through the ion removal filter 22 is always below the durable temperature of the ion exchange resin. That is, the ion exchange resin is not thermally degraded, so that the quality of the cooling water can be maintained even in system operation, while extending the life of the ion removal filter 22.

In addition, the water supply pump 19 can be continuously operated during system operation to continuously maintain the quality of the cooling water.

In addition, according to the arrangement of the polymer electrolyte fuel cell system shown in this embodiment, the ion removal filter 22 lies in the water supply channel 20. Therefore, there is no need to use the bypass channel 7 or flow control valve 8, or to enhance the capability of the cooling water pump 4 shown in the conventional example.

Thus, an inexpensive and highly efficient polymer electrolyte fuel cell system can be realized without increase in the number of components, cost due to enhancement of the capability, or power consumption by auxiliary machinery.

Thus, with the arrangement of the polymer electrolyte fuel cell system shown in this embodiment, besides the actions described in the first embodiment, the quality of the cooling water can be maintained, the life of the ion removal filter 22 can be extended, and the efficiency of the whole system can be improved at a low cost.

Furthermore, an effective method of operating the polymer electrolyte fuel cell system shown in this embodiment will be described.

In this operating method, the water supply pump 19 is activated to maintain the quality of the cooling water when starting and/or terminating the system operation.

When starting the system operation, the cooling water is at a low temperature. Therefore, there is little difference between the temperatures of the water supplied to the cooling water tank 12 and the water discharged therefrom, so that there is little heat loss. When terminating the system operation, the fuel cell 11 does not generate heat. Thus, a heat quantity of the cooling water is decreased by heat quantities of the supplied water and the discharged water, and the temperature of the cooling water is decreased accordingly. That is, since the cooling water and the fuel cell 11 are cooled more rapidly, the termination time can be advantageously shortened.

This operating method is more effectively applied to a polymer electrolyte fuel cell cogeneration system in which heat generated in the fuel cell during electric power generation is collected and thermally used for hot-water supply, heating or the like.

(Third Embodiment)

Figure 3:
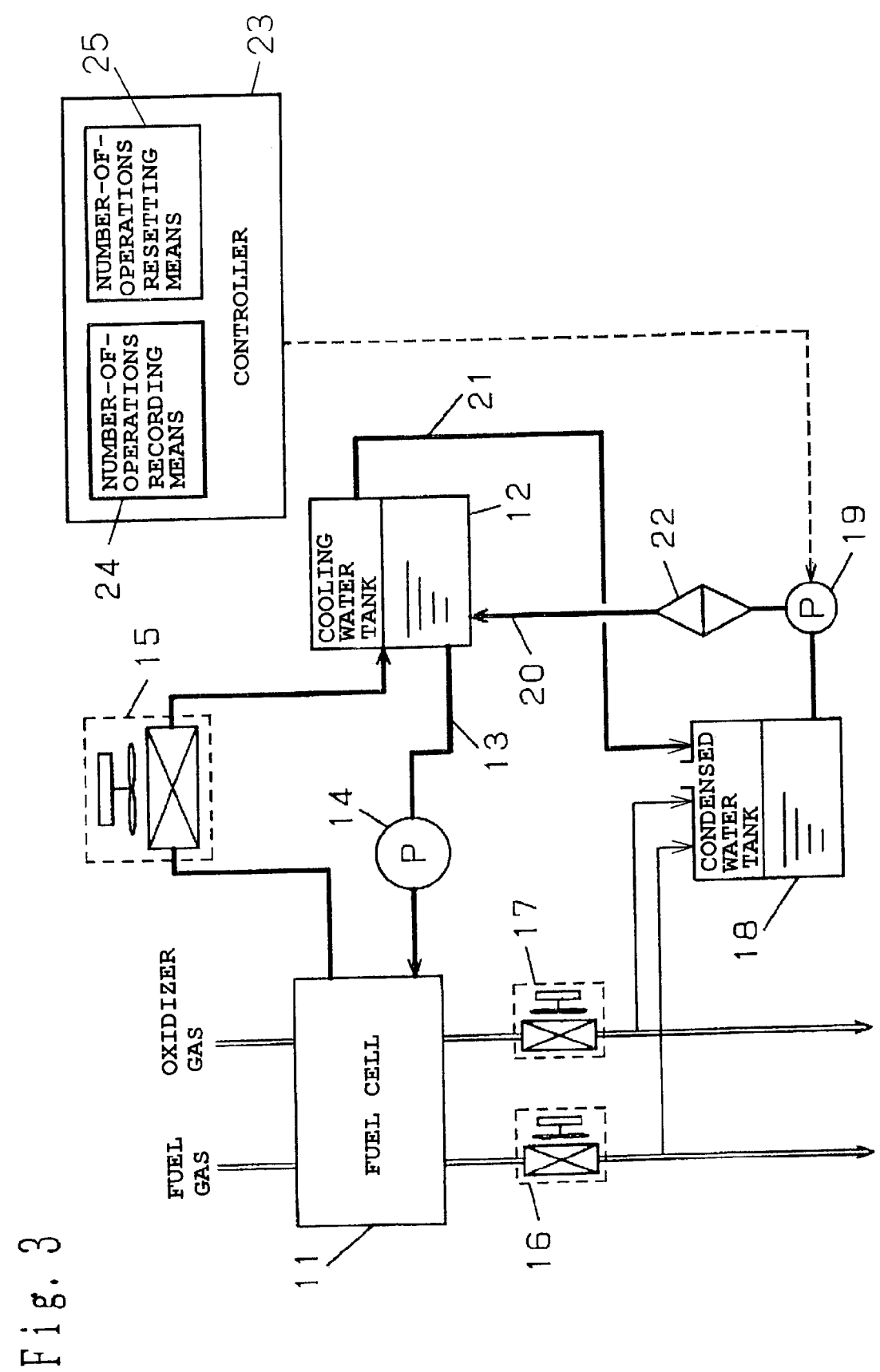
FIG. 3 is a block diagram showing a polymer electrolyte fuel cell system according to a third embodiment of this invention.

FIG. 3 is a block diagram showing a polymer electrolyte fuel cell system according to a third embodiment of this invention. Members identical to those in FIG. 2 and having the same functions as in FIG. 2 are given the same reference numerals, and description thereof will be omitted.

In the polymer electrolyte fuel cell system according to this embodiment, the controller 23 comprises number-of-operations storage means 24 of counting and storing the number of operations of the system and number-of-operations resetting means 25 of resetting the number of operations to an initial condition.

The number-of-operations storage means 24 newly stores a value n+1, which is obtained by adding 1 to the number of operations n, after the system operation is terminated. Besides, the number-of-operations resetting means 25 changes the number of operations n in the number-of-operations storage means 24 to 0, the initial condition, after the operation of the water supply pump 19 is terminated.

Now, an operation of the polymer electrolyte fuel cell system according to this embodiment will be described.

The number of operations n stored in the number-of-operations storage means 24 is compared with a threshold n1 of the number of operations for activation of the water supply pump 19. If n>n1, an instruction is issued from the controller 23 to activate the water supply pump 19. Then, when an instruction to terminate the operation of the water supply pump 19 is issued from the controller 23 to the water supply pump 19 and the operation of the water supply pump 19 is terminated, the number of operations n in the number-of-operations storage means 24 is set to the initial condition, 0, by the number-of-operations resetting means 25. If n<n1 or n=n1, the water supply pump 19 is not activated. Here, the threshold n1 is intended to provide timing for activation of the water supply pump 19 and is set by experimentally determining the number of operations at which the quality of the water in the cooling water tank 12 is degraded when the fuel system is continuously operated.

The instruction can be issued from the controller 23 to the water supply pump 19 at any time when the pump can be activated. In addition, the instruction can be issued more than once. When the instruction is issued more than once, after the water supply pump 19 is activated and then terminated by the last instruction, the number of operations n in the number-of-operations storage means 24 is set to the initial condition, 0, by the number-of-operations resetting means 25.

In this way, with the arrangement of the polymer electrolyte fuel cell system shown in this embodiment, since the activation of the water supply pump 19 is controlled based on the number of operations, the water supply pump 19, which is activated to maintain the quality of the cooling water, can be activated a required number of times, and therefore, can be optimally activated. Whereby, the quality of the cooling water can be optimally maintained, and the life of the ion removal filter 22 can be further extended. That is, a polymer electrolyte fuel cell system capable of extending the life of the ion removal filter 22 for maintaining the quality of the cooling water can be provided.

In this embodiment, the number-of-operations storage means 24 newly stores the value n+1, which is obtained by adding 1 to the number of operations n, after the system operation is terminated. However, it may newly store the value n+1 in place of the value n at any time during system operation including the start and the termination to achieve the same effect.

(Fourth Embodiment)

Figure 4:
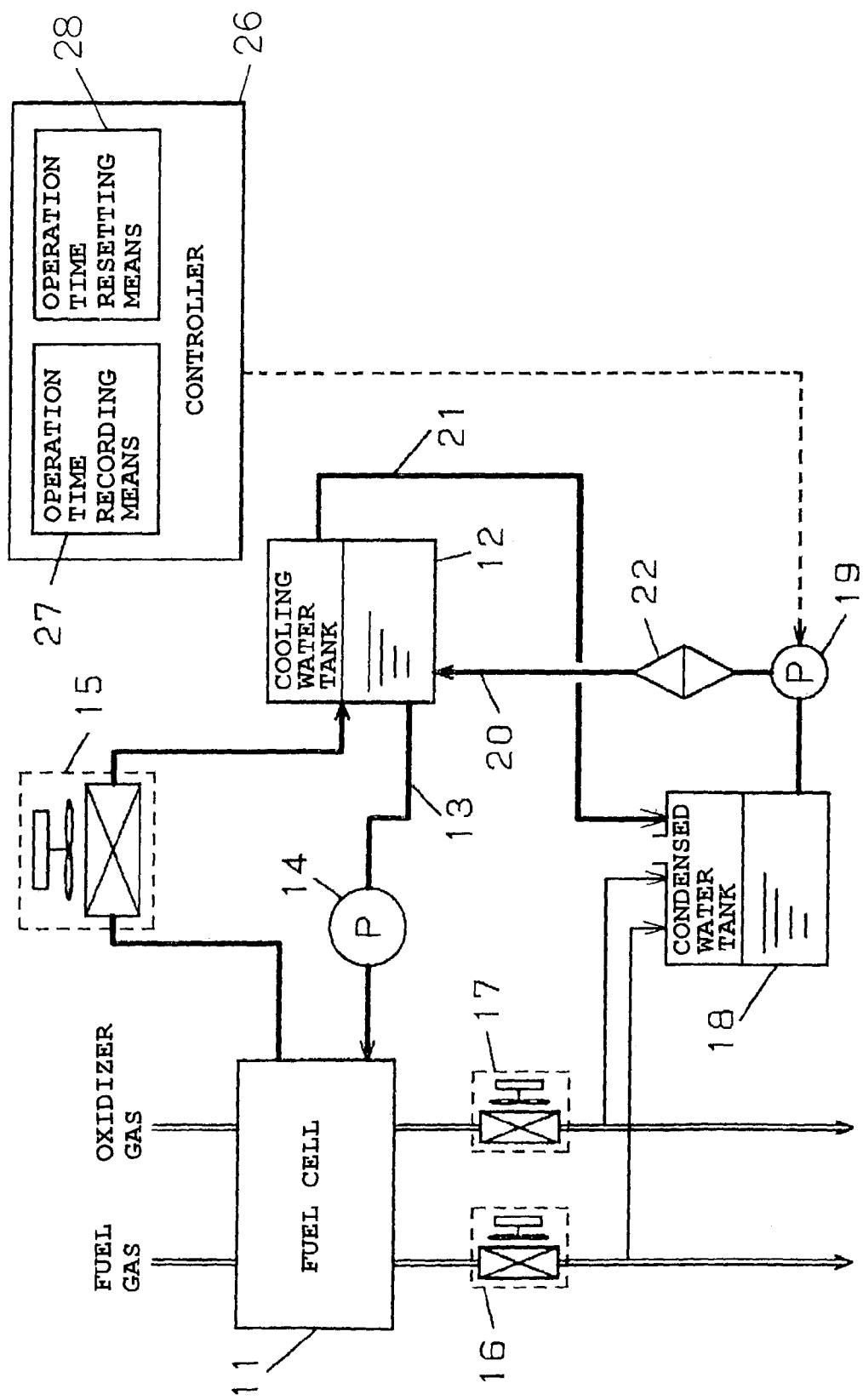
FIG. 4 is a block diagram showing a polymer electrolyte fuel cell system according to a fourth embodiment of this invention.

FIG. 4 is a block diagram showing a polymer electrolyte fuel cell system according to a fourth embodiment of this invention. Members identical to those in FIG. 2 and having the same functions as in FIG. 2 are given the same reference numerals, and description thereof will be omitted.

The polymer electrolyte fuel cell system according to this embodiment comprises a controller 26 that controls activation of the water supply pump 19, and the controller 26 includes operation time storage means 27 of counting and storing the operation time of the system and operation time resetting means 28 of resetting the operation time to an initial condition.

The operation time storage means 27 counts a total time of system operation and newly stores the time. Besides, the operation time resetting means 28 changes the operation time in the operation time storage means 27 to 0, the initial condition, after the operation of the water supply pump 19 is terminated.

Now, an operation of the polymer electrolyte fuel cell system according to this embodiment will be described.

The operation time T stored in the operation time storage means 27 is compared with a threshold T1 of the operation time for activation of the water supply pump 19. If T>T1, an instruction is issued from the controller 26 to activate the water supply pump 19. Then, when an instruction to terminate the operation of the water supply pump 19 is issued from the controller 26 to the water supply pump 19 and the operation of the water supply pump 19 is terminated, the operation time T in the operation time storage means 27 is set to the initial condition, 0, by the operation time resetting means 28. If T<T1 or T=T1, the water supply pump 19 is not activated. Here, the threshold T1 is intended to provide timing for activation of the water supply pump 19 and is set by experimentally determining the operation time at which the quality of the water in the cooling water tank 12 is degraded when the fuel system is continuously operated.

The instruction can be issued from the controller 26 to the water supply pump 19 at any time when the pump can be activated. In addition, the instruction can be issued more than once. When the instruction is issued more than once, after the water supply pump 19 is activated and then terminated by the last instruction, the operation time T in the operation time storage means 27 is set to the initial condition, 0, by the operation time resetting means 28.

In this way, with the arrangement of the polymer electrolyte fuel cell system shown in this embodiment, since the activation of the water supply pump 19 is controlled based on the operation time, the water supply pump 19, which is activated to maintain the quality of the cooling water, can be activated a required number of times, and therefore, can be optimally activated. Whereby, the quality of the cooling water can be optimally maintained, and the life of the ion removal filter 22 can be further extended. That is, a polymer electrolyte fuel cell system capable of extending the life of the ion removal filter 22 for maintaining the quality of the cooling water can be provided.

(Fifth Embodiment)

Figure 5:
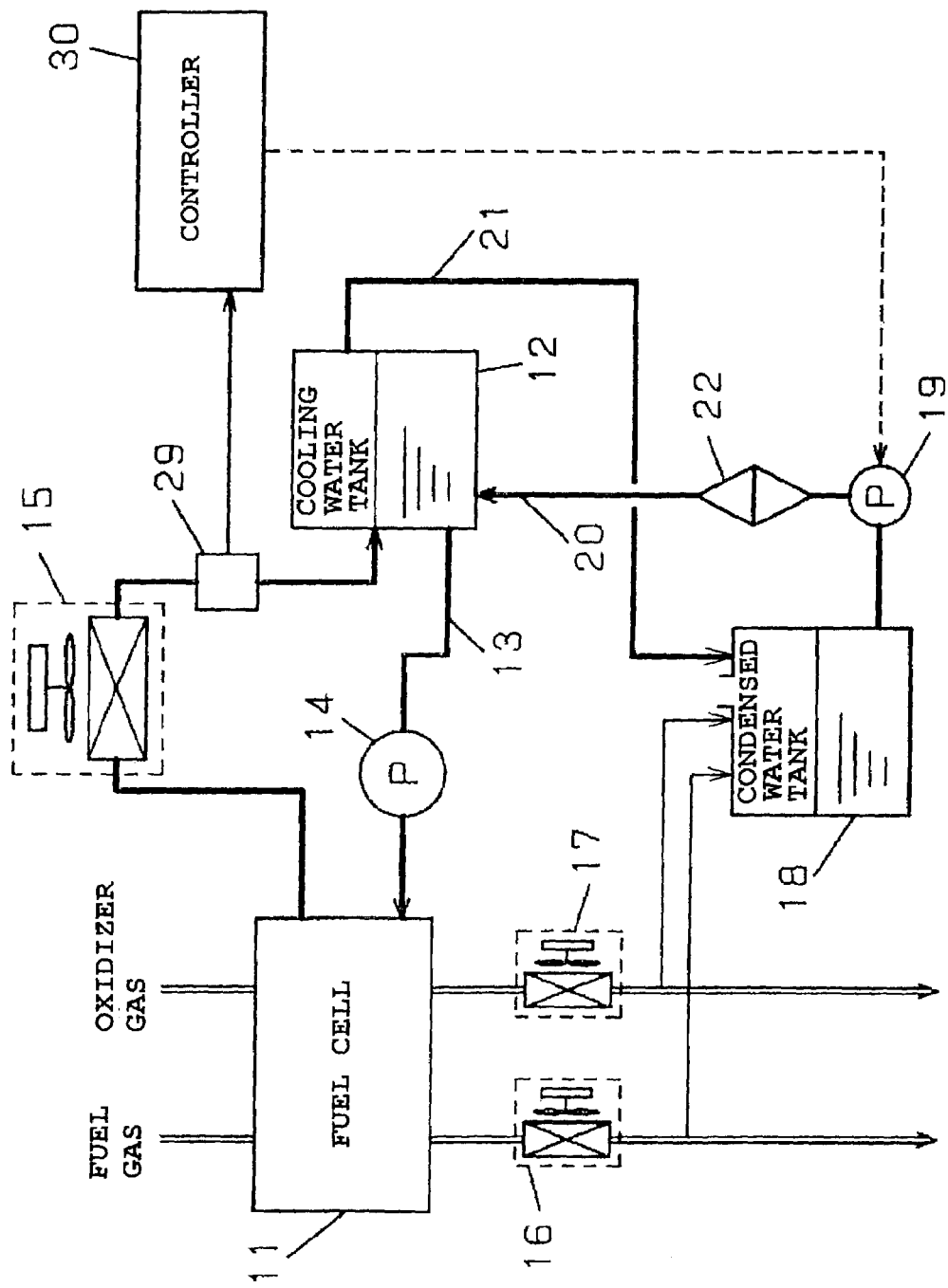
FIG. 5 is a block diagram showing a polymer electrolyte fuel cell system according to a fifth embodiment of this invention.

FIG. 5 is a block diagram showing a polymer electrolyte fuel cell system according to a fifth embodiment of this invention. Members identical to those in FIG. 2 and having the same functions as in FIG. 2 are given the same reference numerals, and description thereof will be omitted.

The polymer electrolyte fuel cell system shown in this embodiment comprises a water quality monitor 29 serving as water quality monitoring means of this invention that monitors the quality of the cooling water circulating through the cooling water channel 13, and a controller 30 that controls activation of the water supply pump 19 according to monitoring by the water quality monitor 29.

The controller 30 has preset first and second reference values. The first reference value is a threshold for activating the water supply pump 19 when a value indicated by the water quality monitor 29 becomes worse than the threshold. The second reference value is a threshold for stopping the operation of the water supply pump 19 when a value indicated by the water quality monitor 29 becomes better than the threshold during operation of the water supply pump 19.

In this embodiment, a conductivity meter is used as the water quality monitor 29. In addition, a conductivity a1 of the water in the cooling water channel 13 is set as the first reference value, and a conductivity a2 of the water in the cooling water channel 13 is set as the second reference value.

Now, an operation of the polymer electrolyte fuel cell system according to this embodiment will be described.

A conductivity a measured by the water quality monitor 29 is compared with the conductivity a1, which is the first reference value for activating the water supply pump 19, and if a>a1, an instruction is issued from the controller 30 to activate the water supply pump 19. The water supply pump 19 continues to operate until the relationship of a<a2 is attained.

During operation of the water supply pump 19, the conductivity a measured by the water quality monitor 29 is compared with the conductivity a2, which is the second reference value for stopping the operation of the water supply pump 19, and if a<a2, an instruction is issued from the controller 30 to stop the operation of the water supply pump 19. The water supply pump 19 continues to stop until the relationship of a>a1 is attained again.

Here, the instruction can be issued from the controller 30 to the water supply pump 19 at any time when the pump can be activated.

In this way, with the arrangement of the polymer electrolyte fuel cell system shown in this embodiment, since the activation of the water supply pump 19 is controlled based on the quality of the cooling water, the water supply pump 19, which is activated to maintain the quality of the cooling water, can be optimally activated. Whereby, the quality of the cooling water can be optimally maintained, and the life of the ion removal filter 22 can be further extended. That is, a polymer electrolyte fuel cell system capable of extending the life of the ion removal filter 22 for maintaining the quality of the cooling water can be provided.

In this embodiment, the quality of the cooling water is indicated by conductivity, and the conductivity meter is used to measure the conductivity. However, the water quality referred to herein is not limited thereto, and the same effect can be attained if the water quality monitor detects pH and the quality of the cooling water is controlled based thereon.

(Sixth Embodiment)

Figure 6:
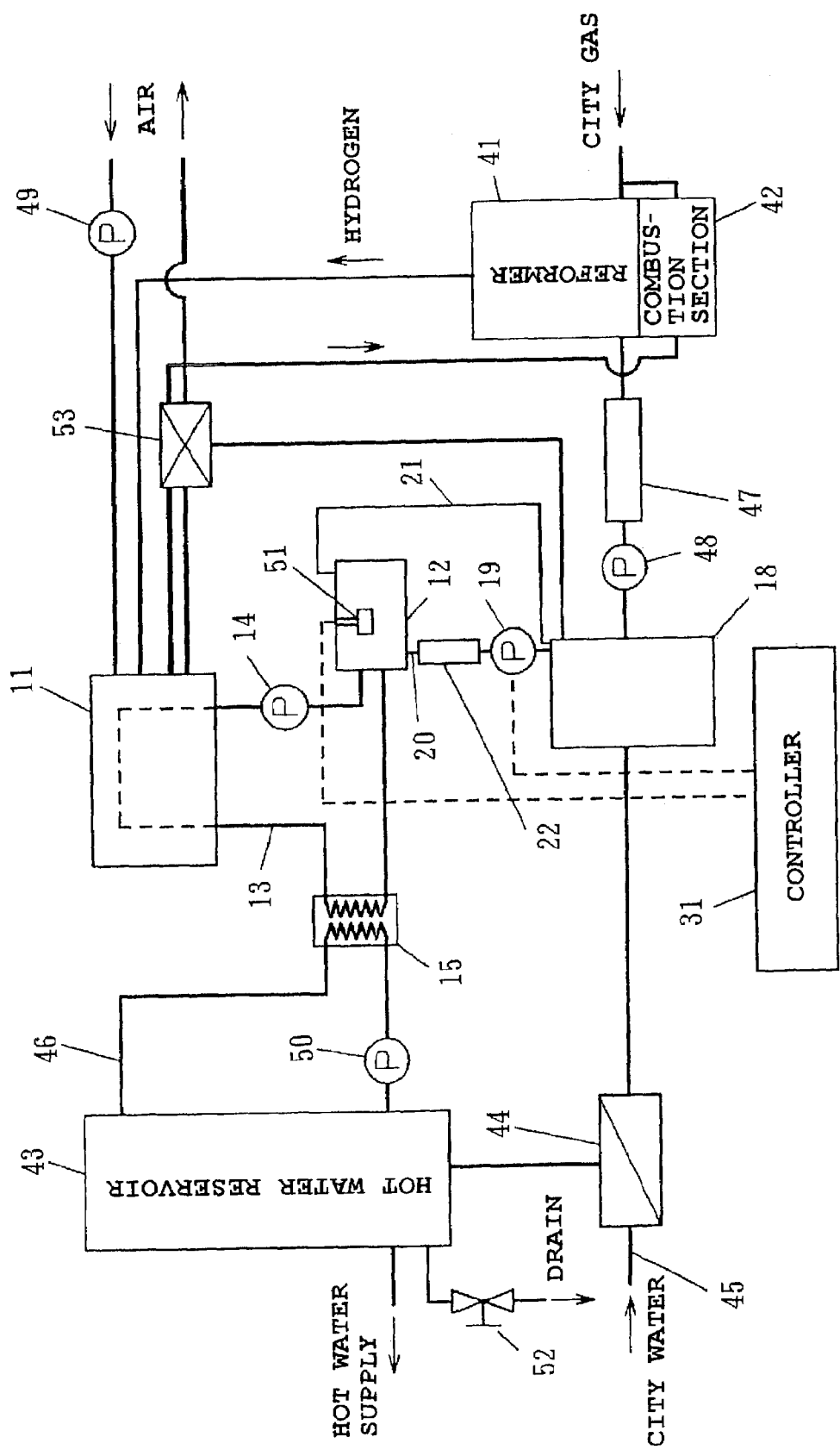
FIG. 6 is a block diagram showing a fuel cell system according to a sixth embodiment of this invention.

FIG. 6 is a block diagram showing a fuel cell system according to a sixth embodiment of this invention. Members identical or corresponding to those in FIGS. 1 and 2 are given the same reference numerals, and description thereof will be omitted. In addition, reference numeral 41 denotes a reformer, reference numeral 42 denotes a combustion section for heating the reformer, reference numeral 43 denotes a hot water reservoir, reference numeral 44 denotes a reverse osmosis membrane device, reference numeral 45 denotes a hot water supply channel, reference numeral 46 denotes a hot water circulation channel, reference numeral 47 denotes an ion removal filter including an ion exchange resin, reference numeral 48 denotes a reformed water supply pump, reference numeral 49 denotes a blower, reference numeral 50 denotes a hot water circulation pump, reference numeral 51 denotes a level sensor, reference numeral 52 denotes a drain valve for discharging the hot water, and reference numeral 31 denotes a controller for controlling the entire system. However, for simplification, the fuel-side condenser 16 and the oxidizer-side condenser 17 are collectively shown as a condenser 53. The same goes for embodiments described later.

As for the fuel cell system thus constructed, an operation will be described below.

City gas and water are reacted in the reformer 41 to produce hydrogen, and a hydrogen-rich gas is supplied to the fuel cell 11. A catalyst is used in the production of hydrogen, and the reformer 41 is heated by burning the city gas in the combustion section 42 so as to attain an optimal catalytic activity. Besides, air is supplied to the fuel cell 11 by means of the blower 49. The hydrogen in the cell and the oxygen in the air are then reacted in the fuel cell 11 to generate electric power, and accordingly water.

From the cooling water tank 12 provided in the cooling water channel 13, water is passed through the fuel cell 11 by the cooling water pump 14, thereby recovering heat generated in electric power generation. If the water in the cooling water tank 12 is reduced, the level sensor 51 detects the reduction of the water level and sends a signal to the controller 31, and the cooling water is supplied by means of the water supply pump 19.

On the other hand, hot water is fed from the hot water reservoir 43 to the hot water circulation channel 46 by means of the hot water circulation pump 50, the heat recovered from the fuel cell 11 is transferred from the cooling water to the hot water in the heat exchange 15, and the hot water returns to the hot water reservoir 43 and is stored therein.

The air discharged from the fuel cell is passed through the condenser 53 to provide condensed water. Then, the water is introduced into the condensed water tank 18, and the air is discharged to the outside of the system. A hydrogen-side exhaust gas is introduced into the combustion section 42 of the reformer and burned with the city gas.

When the hot water in the hot water reservoir 43 is consumed, water is introduced into the hot water reservoir 43 from the outside only by the quantity of consumed hot water. At that time, after passing through the reverse osmosis membrane device 44 provided in the hot water supply channel 45, preliminarily purified water is supplied to the condensed water tank 18, and condensed water is introduced to the hot water reservoir 43.

The reverse osmosis membrane is a membrane with micropores. While most of impurities cannot pass through the membrane, water molecule can pass through it. Therefore, water with a high purity exudes to the other side of the membrane. The impurities not passing through the membrane are discharged in the form of the condensed water. In the purification using the reverse osmosis membrane, the condensed water is typically abandoned, and therefore, it is required to supply a significantly larger amount of raw water than the required amount of pure water. However, according to this embodiment, the condensed water is not discharged but introduced into the hot water reservoir 43, and thus, waste of water is abandoned.

The condensed water tank 18 stores mixed water of the water collected in the system and the water preliminarily purified by the reverse osmosis membrane device. The mixed water is supplied to the reformer 41 by means of the reformed water supply pump 48 and to the cooling water tank 12 by means of the water supply pump 19, after highly purified through the ion removal filters 22 and 47, respectively.

In this embodiment, the water preliminarily purified through the reverse osmosis membrane device 44 is introduced into the condensed water tank 18, mixed with the water collected in the system, and then passed through the ion removal filter 22 or 47. However, the same effect can be achieved if the ion removal filter is disposed before the water preliminarily purified through the reverse osmosis membrane device 44 is mixed with the collected water.

In addition, the same effect can be achieved if the water preliminarily purified through the reverse osmosis membrane device 44 is directly introduced to the ion removal filter 22 and 47 without passing through the condensed water tank 18.

As described above, according to this embodiment, during operation of the fuel cell system, the water circulates through the hot water circulation channel 46, the purified water is supplied to the reverse osmosis membrane device 44, and the condensed water flows to the hot water circulation channel 45 as it is. Therefore, the preliminarily purified water can be obtained without wasting water, the running cost can be kept low, and the life of the ion exchange resin can be extended.

(Seventh Embodiment)

Figure 7:
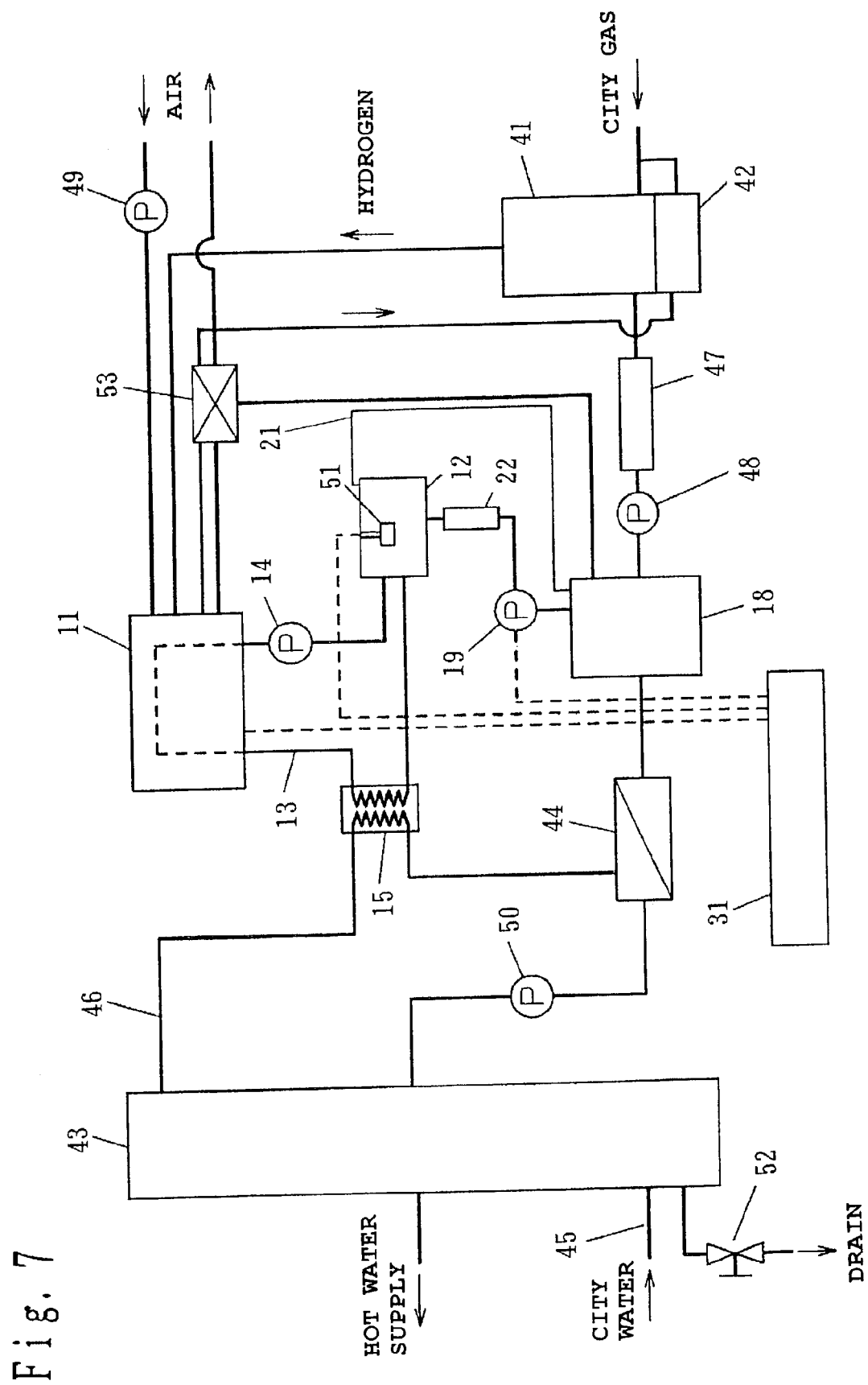
FIG. 7 is a block diagram showing a fuel cell system according to a seventh embodiment of this invention.

FIG. 7 is a block diagram showing a fuel cell system according to a seventh embodiment of this invention. Members identical or corresponding to those in FIG. 6 are given the same reference numerals, and description thereof will be omitted. This embodiment is different from the sixth embodiment in that the reverse osmosis membrane device 44 is provided in the hot water circulation channel 46, rather than in the hot water supply channel 45, with an inlet thereof being connected to the hot water reservoir 43, a condensed water outlet thereof being connected to the heat exchanger 15, and a purified water outlet thereof being connected to the condensed water tank 18.

A channel (not shown) for bypassing the heat exchanger 15, a branch switching valve (not shown) and a temperature sensor (not shown) are provided in the cooling water channel 13, and water streams flowing through the bypass channel and the heat exchanger 15 are adjusted by means of the controller 31. Water is made to run through the hot water circulation channel 46 from the beginning. When the temperature of the cooling water circulating through the cooling water channel 13, detected by the temperature sensor, becomes equal to or higher than a certain value, the branch switching valve switches to pass the water through the hot water circulation channel 46 and begins to store the hot water in the hot water reservoir 43. Thus, after that, the water is supplied to the reverse osmosis membrane device 44 continuously during operation, and the preliminarily purified water is stored in the condensed water tank 18.

In the sixth embodiment, if the usage of the hot water in the hot water reservoir 4 is low and the hot water is left to get cool for example, the city water is not supplied from the outside, and electric power generation is conducted without passing water through the hot water supply channel 45, that is, without adding the preliminarily purified water to the condensed water tank 18. Thus, there is a possibility of lacking the preliminarily purified water. However, in this embodiment, during system operation, the water is continuously passed through the hot water circulation channel 46 according to the quantity of the recovered heat, and therefore, a lack of the preliminarily purified water does not occur.

As described above, according to this embodiment, during operation of the fuel cell system, the water circulates through the hot water circulation channel 46, the purified water is supplied to the reverse osmosis membrane device 44, and the condensed water flows to the hot water circulation channel 45 as it is. Therefore, the preliminarily purified water can be obtained without wasting water, the running cost can be kept low, and the life of the ion exchange resin can be extended.

(Eighth Embodiment)

Figure 8:
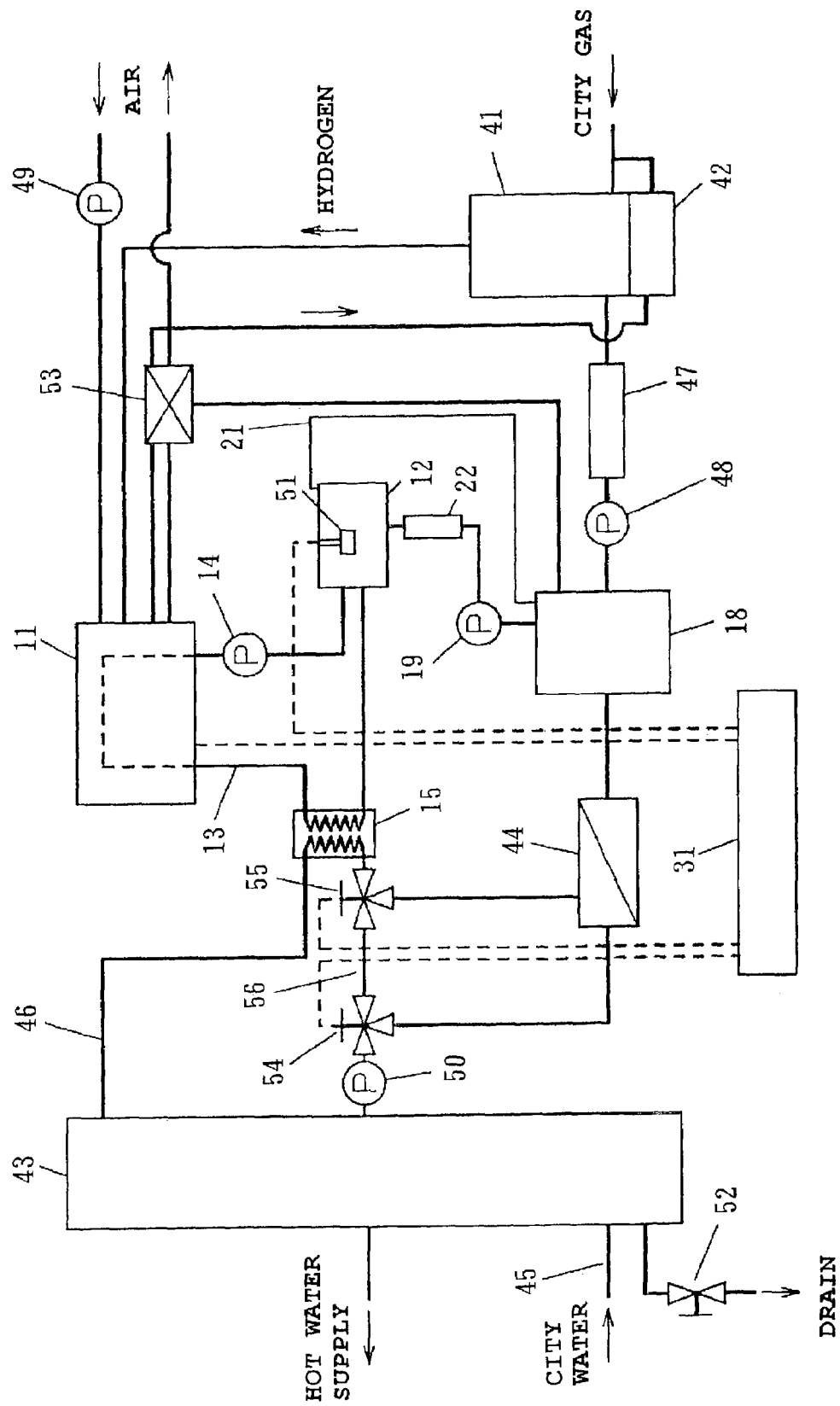
FIG. 8 is a block diagram showing a fuel cell system according to a eighth embodiment of this invention.

FIG. 8 is a block diagram showing a fuel cell system according to an eighth embodiment of this invention. Members identical or corresponding to those in FIGS. 6 and 7 are given the same reference numerals, and description thereof will be omitted. This embodiment is different from the seventh embodiment in that a reverse osmosis membrane inlet-side channel switching valve 54 is provided at the side of an inlet of the reverse osmosis membrane device 44, a condensed water outlet-side channel switching valve 55 is provided at the side of an outlet for the condensed water of the reverse osmosis membrane device 44, and a bypass channel 56 is provided between the reverse osmosis membrane inlet-side channel switching valve 54 and the condensed water outlet-side channel switching valve 55 to directly interconnect them not through the reverse osmosis membrane device 44.

The controller 31 switches the reverse osmosis membrane inlet-side channel switching valve 54 and the condensed water outlet-side channel switching valve 55 according to the operational condition of the system so that a required amount of water is purified by the reverse osmosis membrane device 44, and if no purification is needed, the controller 31 switches so that the water is passed through the bypass channel 56 to avoid excessive purification. Here, as one example of the operational condition of the system, there is a case where the condensed water tank 18 may sufficiently store the preliminarily purified water. In this regard, the amount of the water in the condensed water tank 18 is detected with a water sensor provided therein, or indirectly detected using the level sensor 51 in the cooling water tank 12. Besides, the operational condition of the system includes the case of maintenance of the reverse osmosis membrane device 44.

In this embodiment, the reverse osmosis membrane inlet-side channel switching valve 54 serving as the reverse osmosis membrane inlet-side channel adjusting valve of this invention and the condensed water outlet-side channel switching valve 55 serving as the condensed water outlet-side channel adjusting valve of this invention are channel switching vales. However, the same effect can be achieved if a valve that adjusts a flow ratio, rather than the switching valve, is used at the inlet side of the reverse osmosis membrane device 44 to adjust the flow ratio. And, while the description has been made assuming that both the reverse osmosis membrane inlet-side channel switching valve 54 and the condensed water outlet-side channel switching valve 55 are provided, the system maybe arranged to include either one of them. Furthermore, the same effect can be achieved if a valve that adjusts a flow ratio, rather than the switching valve, is used also at the outlet side of the reverse osmosis membrane device 44 to adjust the flow ratio.

As described above, according to this embodiment, the water supply to the reverse osmosis membrane device 44 can be stopped without stopping the system operation when there is no need to supply water to the reverse osmosis membrane device 44, for example, when there is a sufficient preliminarily purified water or during maintenance of the reverse osmosis membrane device 44. In addition, by avoiding excessive purification of water, the maintenance cycle of the reverse osmosis membrane device can be extended.

In this embodiment, the description has been made assuming that the reverse osmosis membrane inlet-side channel switching valve 54, the condensed water outlet-side channel switching valve 55 and the bypass channel 56 are added to the arrangement of the seventh embodiment shown in FIG. 7. However, they may be added to the arrangement of the sixth embodiment shown in FIG. 6.

(Ninth Embodiment)

Figure 9:
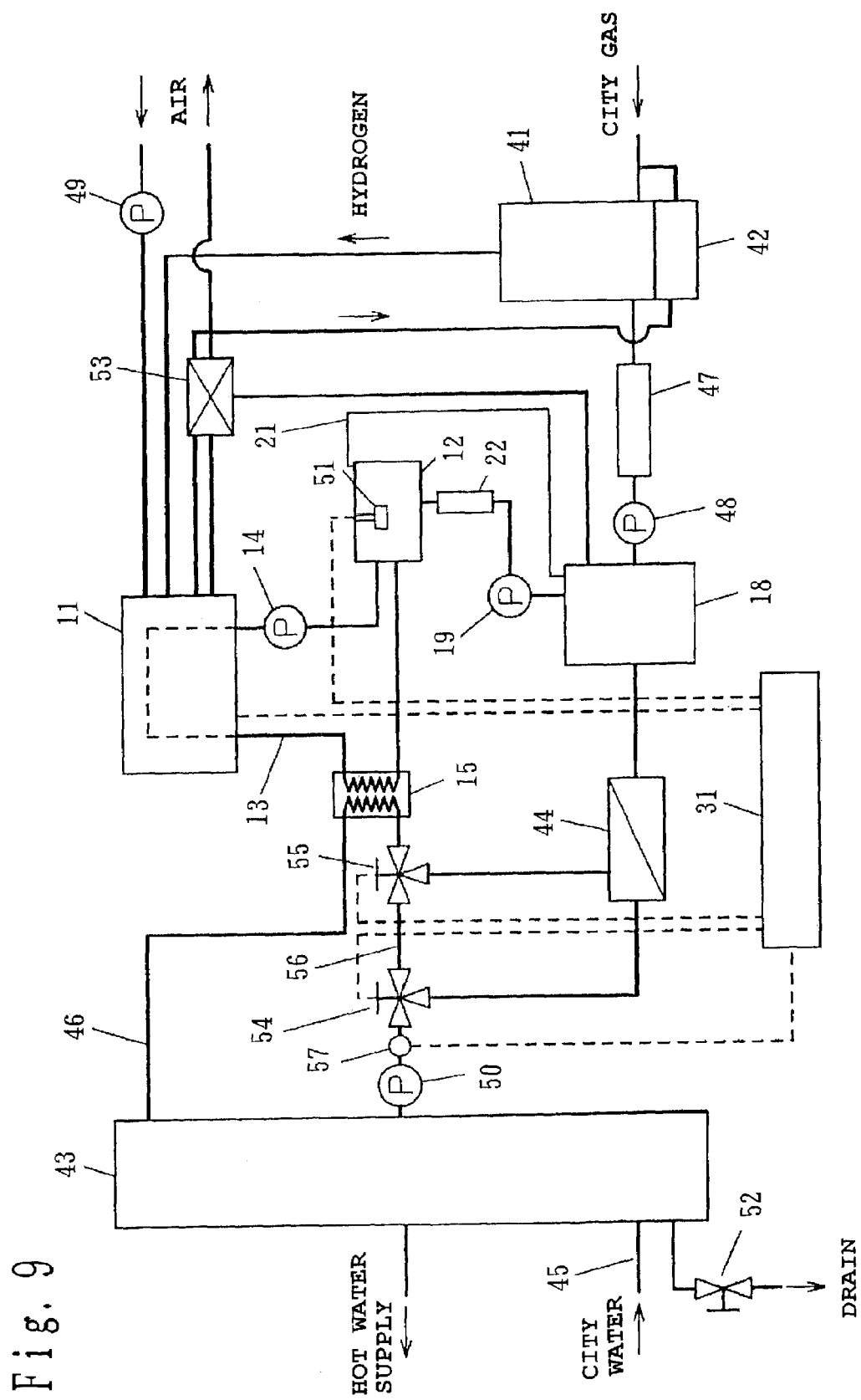
FIG. 9 is a block diagram showing a fuel cell system according to a ninth embodiment of this invention.

FIG. 9 is a block diagram showing a fuel cell system according to a ninth embodiment of this invention. Members identical or corresponding to those in FIGS. 6 and 8 are given the same reference numerals, and description thereof will be omitted. This embodiment is different from the eighth embodiment in that there is provided a temperature sensor 57, which is temperature detecting means of measuring the temperature of the water supplied to the reverse osmosis membrane device 44, and in that according to the temperature measured with the temperature sensor 57, the controller 31 switches the water flow between the bypass channel 56 and the reverse osmosis membrane device 44.

The heat generated in the course of the electric power generation is stored in the hot water reservoir 43, the water in the hot water reservoir 43 has a thermal gradient due to convection, and the temperature of the upper water in the hot water reservoir is increased earlier. A hot water reservoir outlet for the hot water circulation channel 46 is typically provided at a lower part of the hot water reservoir, and water of a low temperature is discharged therefrom. However, when the water is nearly boiled, the temperature of the lower water in the reservoir is also increased, and thus, the temperature of the water entering into the reverse osmosis membrane device 44 is also increased. The temperature of the water to be supplied to the reverse osmosis membrane device 44 is measured with the temperature sensor 57, and if it is equal to or higher than a certain temperature, the reverse osmosis membrane inlet-side channel switching valve 54 and the condensed water outlet-side channel switching valve 55 are switched to prevent the water from flowing through the reverse osmosis membrane device 44, thereby passing the water through the bypass channel 56.

Here, the certain temperature is determined based on the durable temperature of the reverse osmosis membrane of the reverse osmosis membrane device 44. Generally, the reverse osmosis membrane is degraded at a high temperature, the water supplied to the reverse osmosis membrane device 44 needs to be kept equal to or lower than 50° C. in consideration of the durable temperature thereof. Thus, there is a need to prevent the hot water from directly flowing to the reverse osmosis membrane device when the water is nearly boiled. According to such an arrangement, the water can be prevented from flowing into the reverse osmosis membrane device 44 when the temperature of the hot water is high.

In this embodiment, when the temperature of the water is equal to or higher than a certain temperature, the reverse osmosis membrane inlet-side channel switching valve 54 and the condensed water outlet-side channel switching valve 55 are switched to prevent the water from flowing through the reverse osmosis membrane device 44, thereby passing the water through the bypass channel 56. However, the same effect can be achieved if a valve capable of adjusting the flow ratio is used to adjust the ratio between the flow rates of the bypass channel 56 and the reverse osmosis membrane device 44.

As described above, according to this embodiment, since the reverse osmosis membrane at a higher temperature can provide more pure water, the amount of the water flowing through the reverse osmosis membrane device 44 is adjusted according to the temperature, and thus a required amount of preliminarily purified water can be obtained. Besides, the reverse osmosis membrane is generally susceptible to high temperature. Thus, a certain temperature is predetermined, and when the temperature becomes equal to or higher than the certain temperature, the water supply to the reverse osmosis membrane device 44 is completely stopped, whereby the reverse osmosis membrane device can be prevented from being degraded and the life thereof can be extended.

(Tenth Embodiment)

Figure 10:
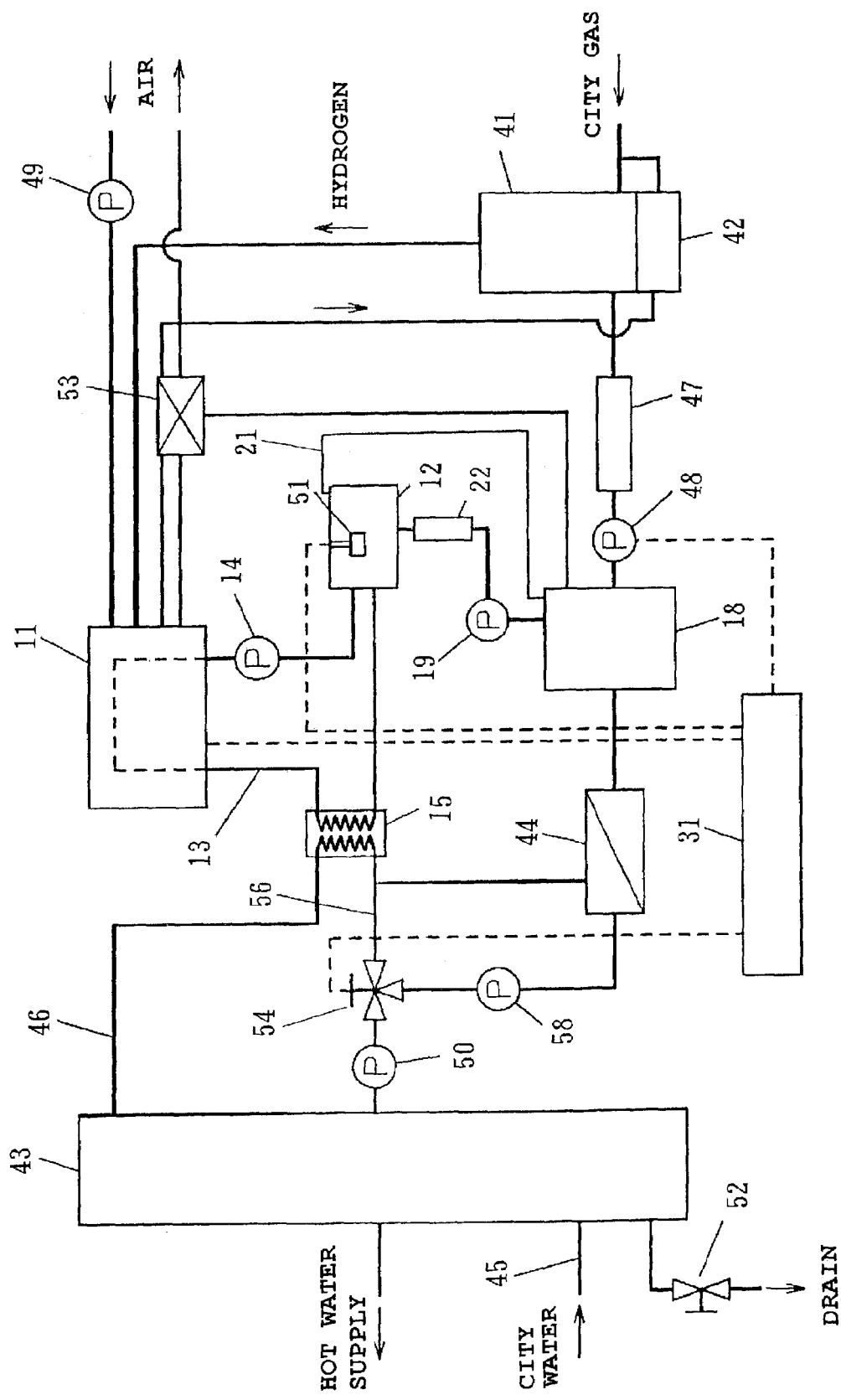
FIG. 10 is a block diagram showing a fuel cell system according to a tenth embodiment of this invention.

FIG. 10 is a block diagram showing a fuel cell system according to a tenth embodiment of this invention. Members identical or corresponding to those in FIGS. 6 to 9 are given the same reference numerals, and description thereof will be omitted. This embodiment is characterized in that a booster pump 58, which is booster means of increasing the pressure of water, is provided in the inlet-side channel of the reverse osmosis membrane device 44. However, in this shown arrangement, the condensed water outlet-side channel switching valve 55 is omitted (or alternatively, may be provided).

The water passing through the hot water circulation channel 46 has a flow rate significantly higher than that of the water passing through the hot water supply channel 45 but it has a pressure generally lower than that of the tap water. If the pressure thereof is low, there is a possibility of a lack of the water provided at the reverse osmosis membrane device 44. Providing the booster pump 58 in the inlet-side channel of the reverse osmosis membrane device 44 and applying pressure as required allows the amount of the water purified in the reverse osmosis membrane device 44 to be adjusted and the lack of the preliminarily purified water to be avoided.

As described above, according to this embodiment, since the higher the pressure of the water, the more purified water the reverse osmosis membrane device 44 can provide, when the usage of water is high and the capability of preliminary purification becomes insufficient, the insufficient capability can be compensated by increasing the pressure of the water.

As for the above-described arrangement, the description has been made assuming that the booster pump 58 is provided in the arrangement including the reverse osmosis membrane inlet-side channel switching valve 54 and the bypass channel 56. However, as in the eighth and ninth embodiments, the booster pump 58 may be provided in the arrangement additionally including the condensed water outlet-side channel switching valve 55, or provided between the hot water circulation pump 50 and the inlet of the reverse osmosis membrane device 44 in the seventh embodiment.

(Eleventh Embodiment)

Figure 11:
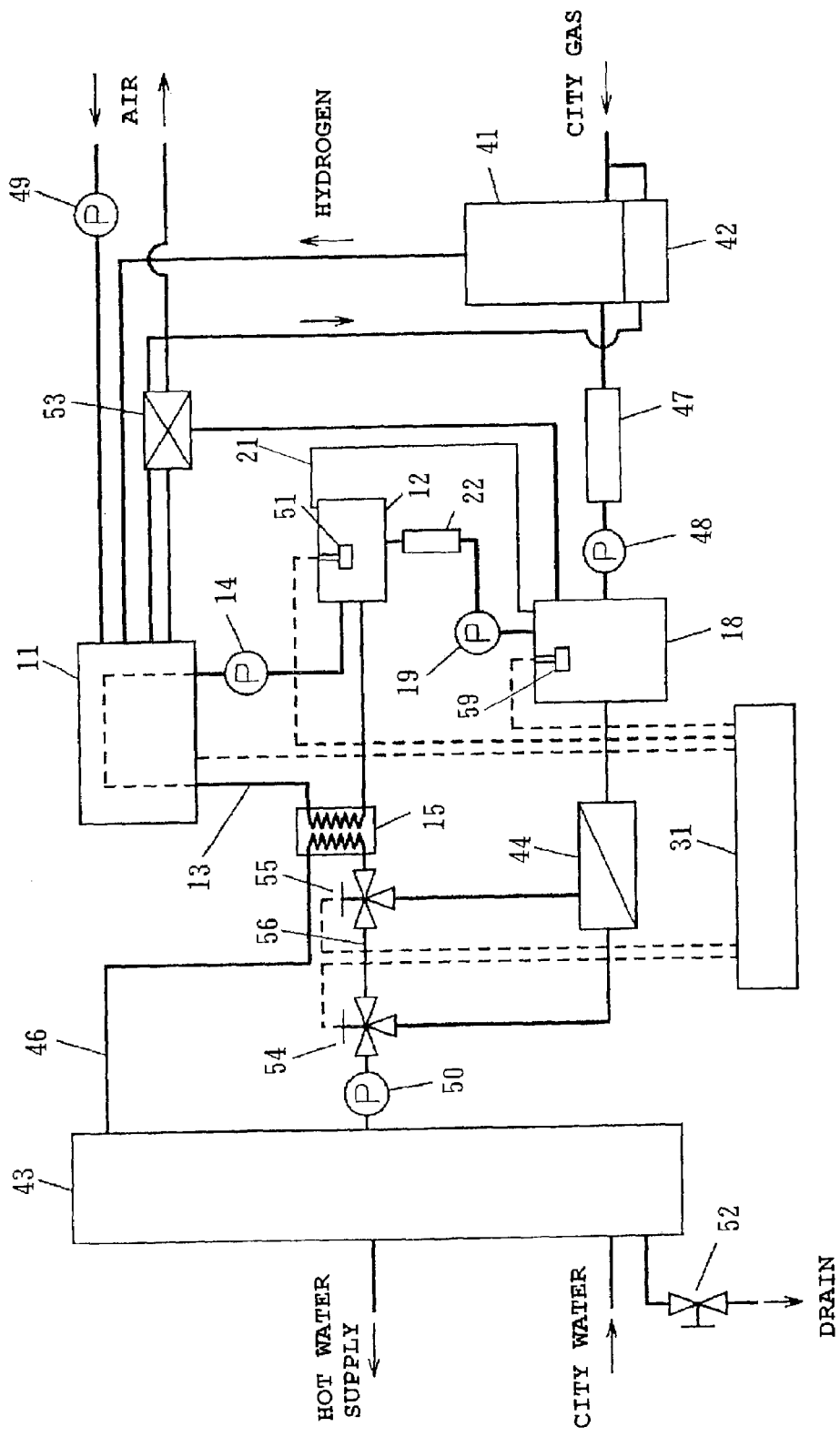
FIG. 11 is a block diagram showing a fuel cell system according to a eleventh embodiment of this invention.

FIG. 11 is a block diagram showing a fuel cell system according to an eleventh embodiment of this invention. In this drawing, members identical or corresponding to those in FIGS. 6 and 8 are given the same reference numerals, and description thereof will be omitted. This embodiment is characterized in that there is provided a level sensor 59 for measuring a water level, which is water-amount measuring means of measuring the amount of the water stored in the condensed water tank 18 that stores the water preliminarily purified by the reverse osmosis membrane device 44.

In a state where heat exchange is conducted in the heat exchanger 15 after passing through the bypass channel 56 from the hot water reservoir 43, when the water in the condensed water tank 18 is reduced, the water level is lowered, the level sensor 59 detects the lowering of the water level, and a signal is transmitted to the controller 31. In response to the signal, the controller 31 transmits an instruction to the reverse osmosis membrane inlet-side channel switching valve 54 and the condensed water outlet-side channel switching valve 55 to switch the flow channel so that the water from the hot water reservoir 43 passes through the bypass channel 56 to the reverse osmosis membrane device 44.

Thus, since purification by the reverse osmosis membrane device 44 can be conducted only when the amount of water in the condensed water tank 18 is small, the maintenance cycle of the reverse osmosis membrane device 44 can be extended.

While in this embodiment, the level sensor that measures the water level in the tank is used as the water-amount measuring means, the same effect can be achieved if the water level is measured in another way, such as measurement of the weight of the tank, optical detection of the water surface and the like.

As described above, according to this embodiment, when the amount of water detected with the water-amount measuring means is large, the flow rate of the bypass channel 56 is increased, or the water passes only through the bypass channel 56. Thus, the preliminary purification of water by the reverse osmosis membrane device 44 can be conducted only when it is needed, whereby the life of the reverse osmosis membrane device 44 can be extended.

As for the above-described arrangement, the description has been made assuming that the level sensor 59, the reverse osmosis membrane inlet-side channel switching valve 54, the condensed water outlet-side channel switching valve 55 and the bypass channel 56 are added to the arrangement of the seventh embodiment shown in FIG. 7. However, they may be added to the arrangement of the sixth embodiment shown in FIG. 6.

(Twelfth Embodiment)

Figure 12:
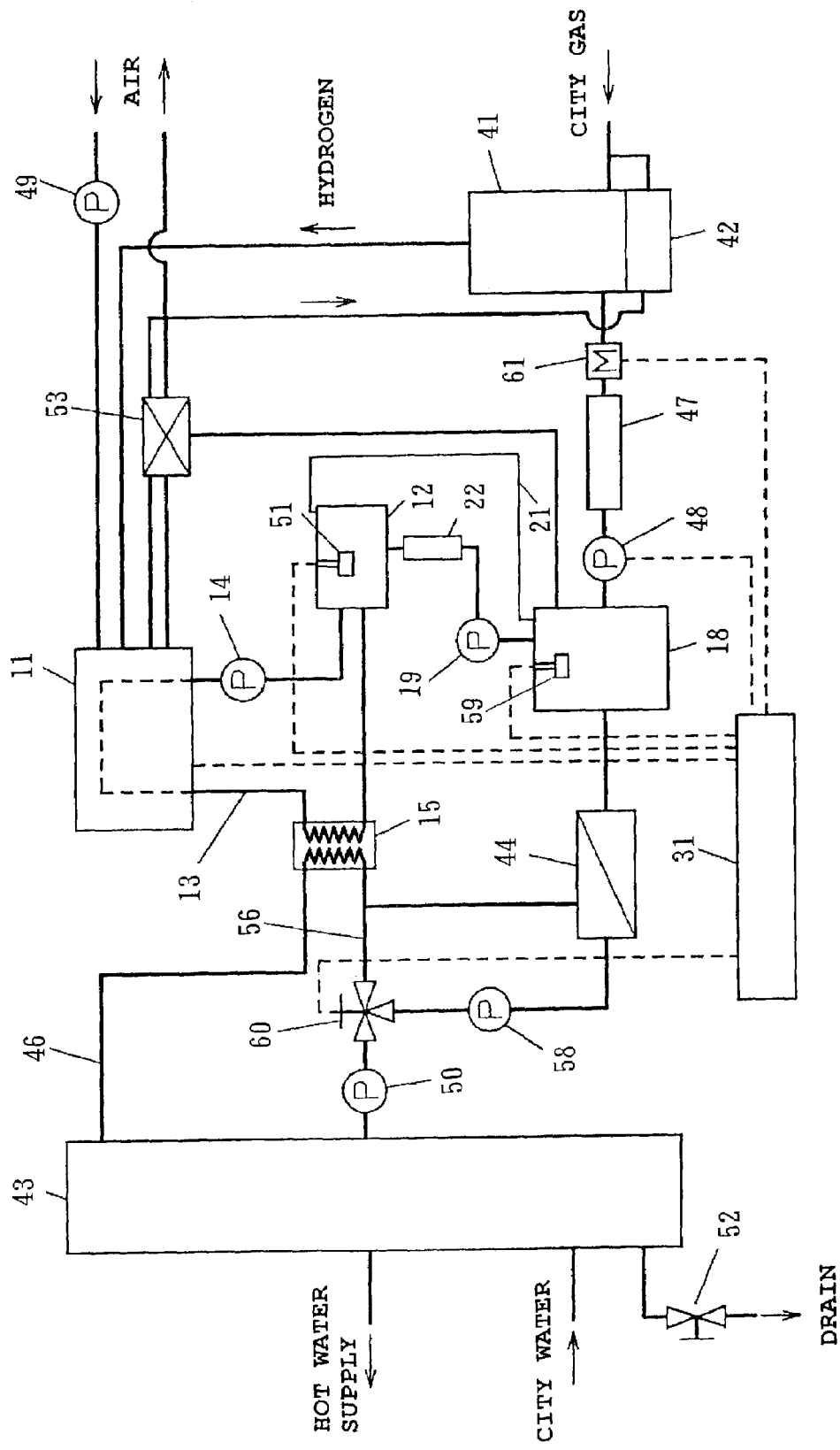
FIG. 12 is a block diagram showing a fuel cell system according to a twelfth embodiment of this invention.

FIG. 12 is a block diagram showing a fuel cell system according to a twelfth embodiment of this invention. In this drawing, members identical or corresponding to those in FIGS. 6 to 11 are given the same reference numerals, and description thereof will be omitted. Reference numeral 60 denotes a flow ratio control valve serving as a reverse osmosis membrane inlet-side channel control valve of this invention, and reference numeral 61 denotes a flow meter. In this shown arrangement, the condensed water outlet-side channel switching valve 55 is omitted (or alternatively, may be provided).

This embodiment is characterized in that there is provided the flow meter 61, which is flow rate measuring means of measuring the flow rate of the water supplied to the reformer 41.

The water level in the condensed water tank 18 is detected with the level sensor 51, the amount of the water supplied to the reformed is measured with the flow meter 61 to obtain the usage rate of water, the controller 31 controls the flow ratio control valve 60 so that a required amount of water can be purified, and a required amount of water is preliminarily purified.

Even in the case where the purification in the reverse osmosis membrane device 44 is started after the water level in the condensed water tank 18 is detected, if a large amount of water is used, the water in the condensed water tank 18 may be reduced rapidly. However, with such an arrangement, a required amount of water is purified and excessive purification is avoided, so that the life of the reverse osmosis membrane device 44 can be extended.

As described above, according to this embodiment, when the amount of generated hydrogen is varied according to the desired amount of electric power, the amount of the water to be reformed is varied accordingly, and therefore, the usage of water can be found by detecting the amount of the water reformed. Thus, when the usage is high, the amount of the water passing through the reverse osmosis membrane device 44 is increased, or when the usage is low, the amount of the water passing through the reverse osmosis membrane device 44 is decreased, whereby a required amount of water can be preliminarily purified and the life of the reverse osmosis membrane device 44 can be extended.

The same effect can be achieved if the flow meter is provided in the water supply channel 20 to measure the flow rate of the supplied water, whereby the controller 31 controls the flow ratio control valve 60 so that a required amount of water can be purified. Furthermore, in the above-described embodiment, the description has been made assuming that the flow meter 61 and the flow ratio control valve 60 are added to the arrangement of the seventh embodiment shown in FIG. 7. However, they may be added to the arrangement of the sixth embodiment shown in FIG. 6.

(Thirteenth Embodiment)

Figure 13:
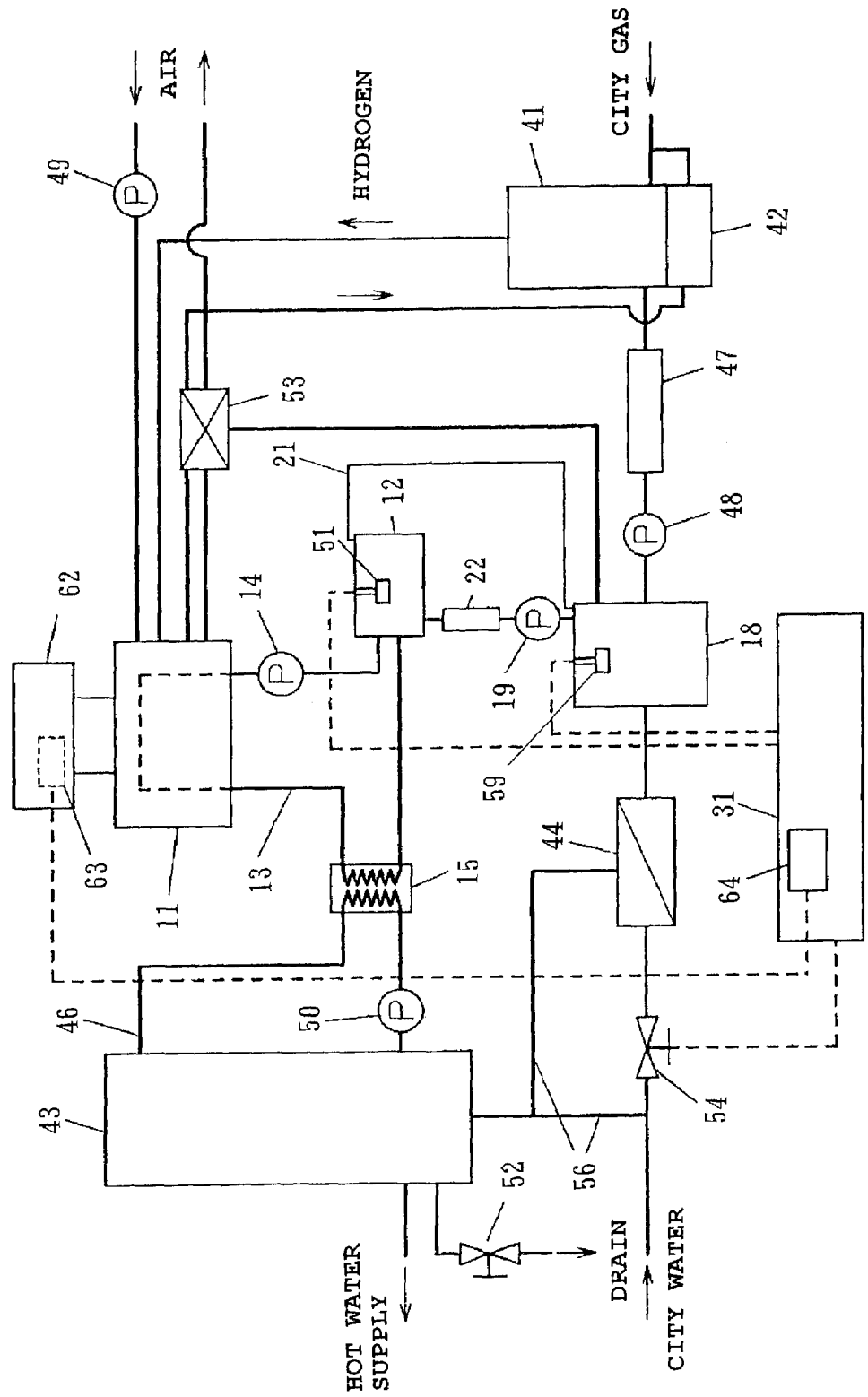
FIG. 13 is a block diagram showing a fuel cell system according to a thirteenth embodiment of this invention.

FIG. 13 is a block diagram showing a fuel cell system according to a thirteenth embodiment of this invention. In this drawing, members identical or corresponding to those in FIGS. 6 to 12 are given the same reference numerals, and description thereof will be omitted. Reference numeral 62 denotes an amount-of-electric-power-generation-controlling section, reference numeral 63 denotes a current measuring section and reference numeral 64 denotes amount-of-collected-condensed-water-estimating means. However, in this shown arrangement, condensed water outlet-side channel switching valve 55 is omitted (or alternatively, may be provided).

This embodiment is characterized in that there are provided the current measuring section 63 serving as amount-of-electric-power-generation-measuring means of measuring the amount of electric power generated by the fuel cell 11 and the amount-of-collected-condensed-water-estimating means 64 of estimating the amount of the collected water based on the measured current value.

Since in the amount-of-electric power-generation-controlling section 62, the amount of extracted current is controlled by the instruction from the controller 31 so as to generate a required amount of electric power, an actual current extracted is measured with the current measuring section 63.

In the electric power generation in the fuel cell, a phenomenon as shown in FIG. 1 occurs therein. Therefore, the amount of the collected water can be estimated based on the current value.

Figure 14:
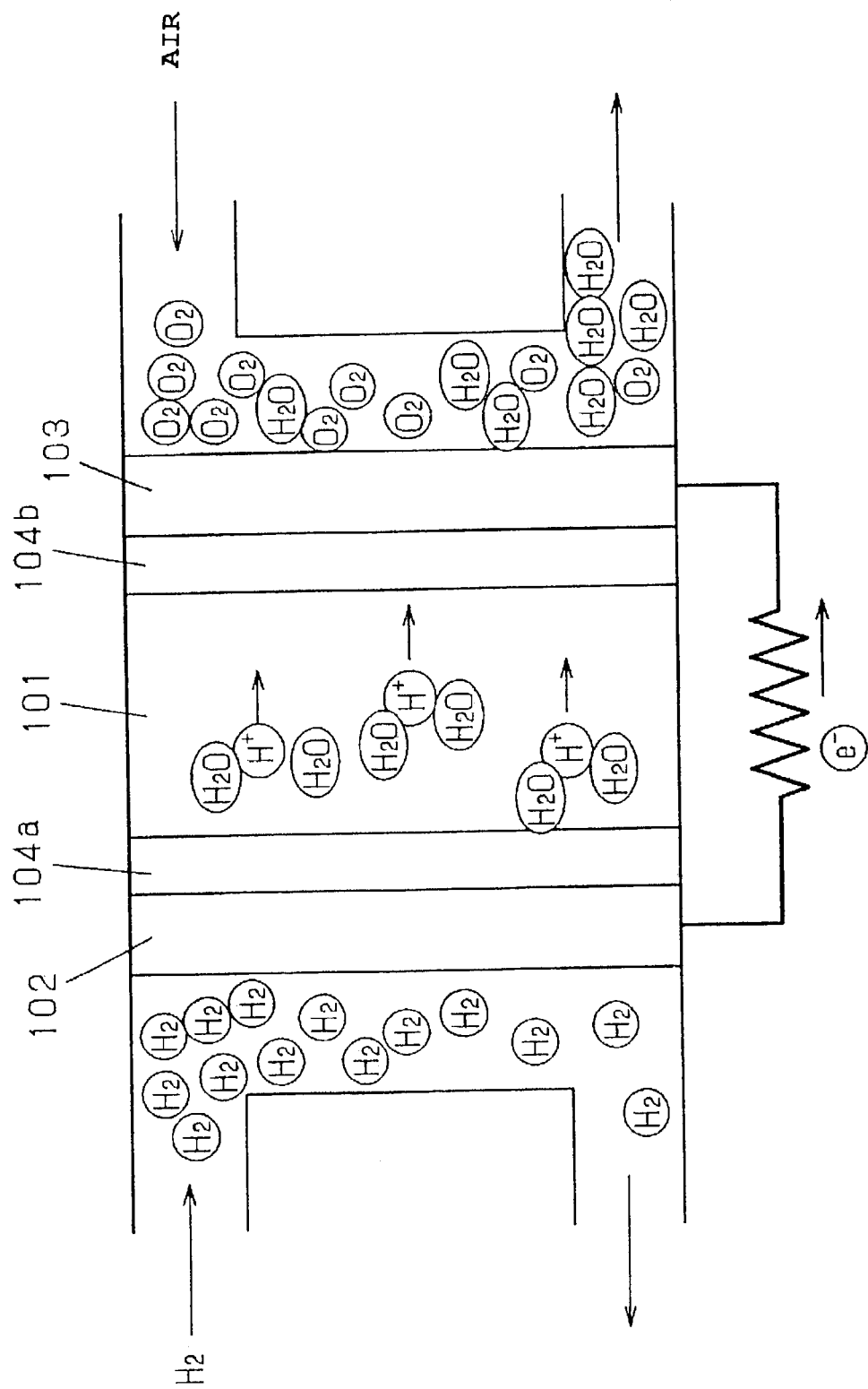
FIG. 14 is a conceptual diagram illustrating a reaction in a fuel cell.

FIG. 14 is a conceptual diagram illustrating a reaction in a fuel cell. Reference numeral 101 denotes an electrolyte, reference numeral 102 denotes a fuel electrode, reference numeral 103 denotes an air electrode and reference numerals 104a and 104b denote hydrogen-side and air-side catalyst layers, respectively.

Hydrogen $H_2$, which is supplied as fuel, emits an electron $e^-$ in the hydrogen-side catalyst layer 104a to become $H^+$. The electron $e^-$ is extracted to the outside via the fuel electrode 102. The travel per unit time of the $H^+$ or $e^-$ indicates the current extracted during electric power generation. The $H^+$ moves through the electrolyte 101 to the side of air and, in the air-side catalyst layer 104b, is bonded with oxygen $O_2$ in the air and electron $e^-$ supplied by the air electrode 103, whereby water $H_2O$ is generated, and gas is exhausted from the fuel cell. The amount of the generated water is proportional to the number of hydrogen ions $H^+$, that is, the current, and the amount of the water moved accompanying with the $H^+$ is substantially proportional to the number of the hydrogen ions $H^+$, and therefore, it is substantially determined by the amount of electric power generation.

In the case of the polymer electrolyte fuel cell, since the solid polymer electrolyte need to be kept moist to realize electric power generation with high efficiency, both the air and the fuel are introduced into the fuel cell with being humidified. It is said that during electric power generation, the $H^+$ is accompanied with water molecules when it passes through the electrolyte and then moves to the side of the air electrode. Thus, the water in the fuel gas is reduced, and the exhaust gas on the side of air contains the water moved, the water generated in the reaction, and the water originally contained as humidity.

Therefore, by detecting the current, the amount of the water collected by the condenser 53 as condensed water can be estimated with the collected condensed water estimating means 64. And by determining the amount of water to be supplied to the reverse osmosis membrane device 44 according to the amount of the collected water and supplying a minimum required amount of water, the life of the reverse osmosis membrane device 44 can be extended.

In this embodiment, the current is directly measured. However, if the current-voltage characteristic of the fuel cell is previously measured, the current value can be determined from the values of voltage and electric power. Thus, the voltage or electric power may be measured to achieve the same effect.

As described above, according to this embodiment, since the amount of the water generated in the fuel cell 11 is determined by the amount of electric power generation, the water that can be collected in the system can be estimated by measuring the amount of electric power generation. If the estimated amount is large, the amount of the water preliminarily purified by the reverse osmosis membrane device 44 is decreased, and if it is small, a required amount of water can be preliminarily purified by the reverse osmosis membrane device 44, whereby the life of the reverse osmosis membrane device 44 can be extended.

In the above-described embodiment, the description has been made assuming that the amount-of-electric-power-generation-controlling section 62, the current measuring section 63 and the amount-of-collected-condensed-water-estimating means 64 are added to the arrangement of the sixth embodiment shown in FIG. 6. However, they may be added to the arrangement of the seventh embodiment shown in FIG. 7.

(Fourteenth Embodiment)

Figure 15:
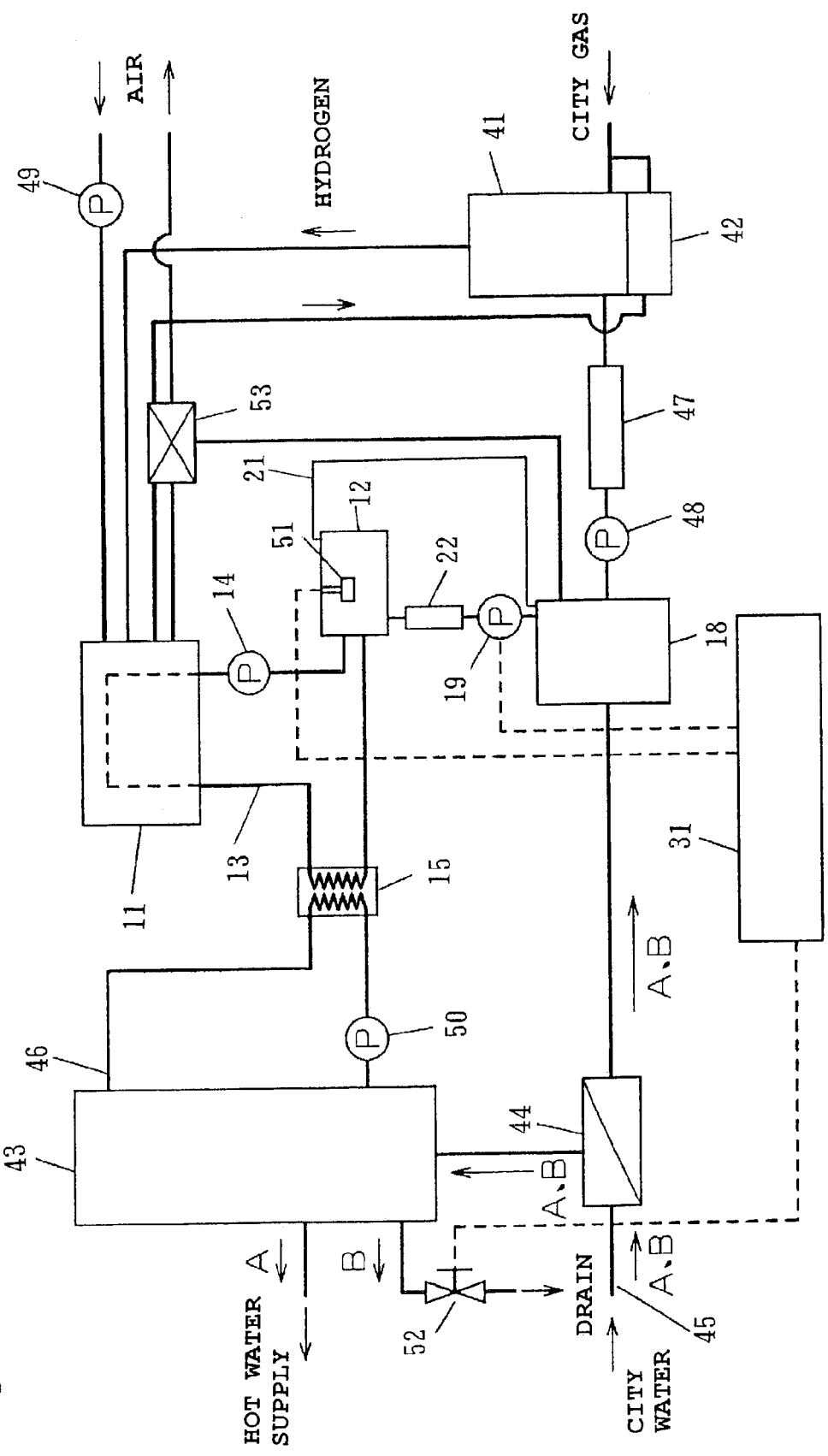
FIG. 15 is a block diagram showing a fuel cell system according to a ninth embodiment of this invention.
Figure 16:
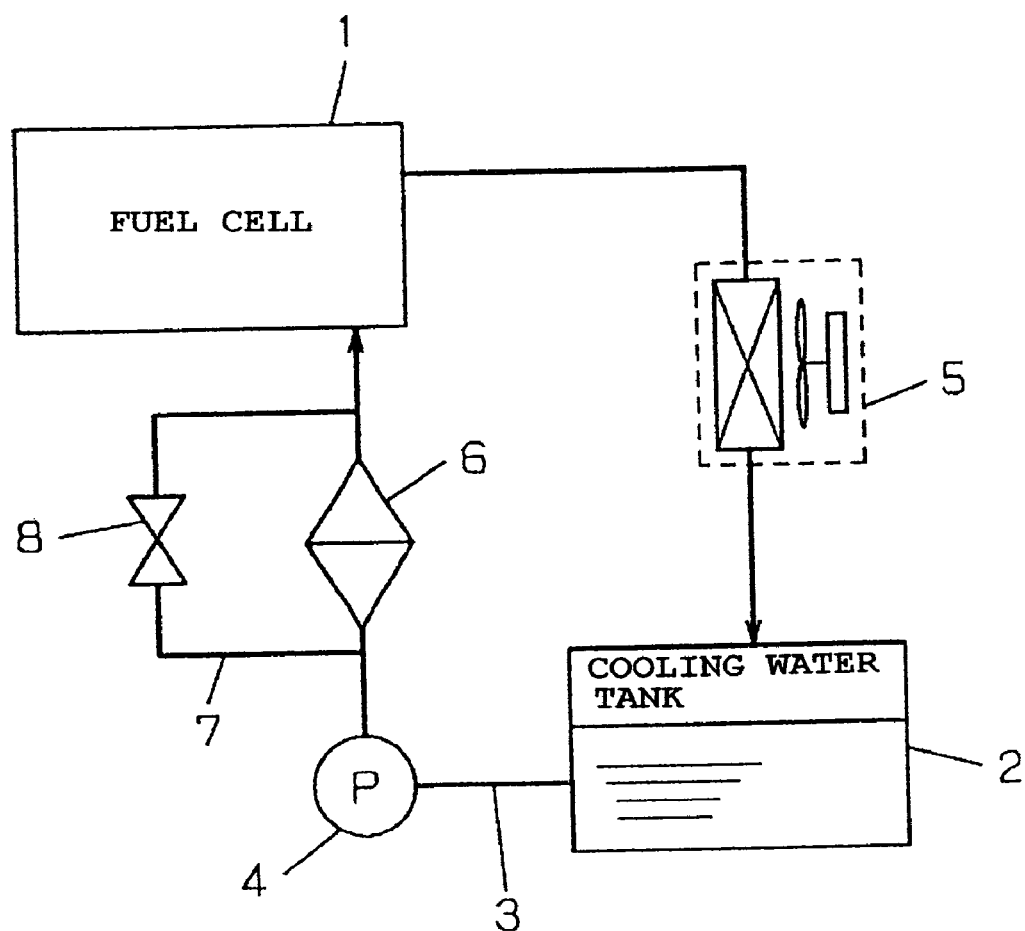
FIG. 16 is a block diagram showing a conventional polymer electrolyte fuel cell system.

FIG. 15 is a block diagram showing a fuel cell system according to a fourteenth embodiment of this invention. In this drawing, members identical or corresponding to those in FIGS. 6 to 13 are given the same reference numerals, and description thereof will be omitted.

This embodiment is characterized in that, in the fuel cell system of the sixth embodiment, when the preliminarily purified water becomes insufficient, the water in the hot water reservoir is discharged.

An arrow A indicates the flow of water in the case of using hot water, and an arrow B indicates the flow of water in the case of discharging water through the drain valve 52. The arrows A and B indicate that water flows in the same direction in either case.

Since water flows through the hot water supply channel 46 only when the hot water in the hot water reservoir 43 is used, if the usage of the hot water in the hot water reservoir 43 is low and the hot water is left to get cool for example, the city water is not supplied from the outside, and electric power generation is conducted without passing water through the hot water supply channel 45, that is, without water supplied to the condensed water tank 18 through the reverse osmosis membrane device 44. Thus, there is a possibility of lacking the preliminarily purified water.

The hot water reservoir 43 is typically provided with the drain valve 52 for drainage. Therefore, if the preliminarily purified water is insufficient, water is discharged through the drain valve 52 of the hot water reservoir 43. Then, the water flows in the direction indicated by the arrow B, the water flows through the hot water supply channel 45, and thus, water purification can be conducted in the reverse osmosis membrane device 44. At this time, the hot water in the hot water reservoir 43 has got cool, and heat is not wasted.

As described above, according to this embodiment, generally, when the hot water in the hot water reservoir 43 is used, the hot water is supplied thereto by the amount corresponding to the usage. Thus, no water flows through the hot water supply channel 45 unless the hot water is used. Therefore, in the fuel cell system having the reverse osmosis membrane device 44 provided in the hot water supply channel 45, there is a possibility of a lack of the preliminarily purified water if the next electric power generation is started in a state where the hot water is left, without being used, to get cool. A commercially-available hot water reservoir is generally provided with the drain valve 52 for drainage. Therefore, in such a case, water is discharged through the drain valve 52 to add water to the hot water reservoir 43, whereby the water can be preliminarily purified in the reverse osmosis membrane device 44.

While in the above-described embodiments, the polymer electrolyte fuel cell is used as the fuel cell, the fuel cell of this invention may be another type of fuel cell.

While in the above-described embodiments, the description has been made using the ion removal filter including the ion exchange resin as the water quality treatment means, the water quality treatment means of this invention may be a hollow fiber or means of electrically separating ions.

INDUSTRIAL APPLICABILITY

As apparently seen from the above description, the present invention can provide a fuel cell system in which the cooling water tank and the cooling water channel need not be constructed so as to withstand pressure variation.

In addition, the quality of the cooling water can be maintained, thermal degradation of the water quality treatment means can be prevented to extend the life thereof, and a fuel cell system having an overall high efficiency can be provided at a low cost.

In addition, with the fuel cell system according to this invention, the reverse osmosis membrane device can purify water without discharging the condensed water, and therefore, water is not wasted and the life of the ion exchange resin used in the water quality treatment means can be extended.

In addition, since minimum water purification is conducted in the reverse osmosis membrane device, the maintenance cycle of the reverse osmosis membrane device can be extended.

The invention claimed is:

1. A fuel cell system, comprising:
    a fuel cell that generates electric power using a fuel gas and an oxidizer gas;
    a cooling water tank that stores cooling water for cooling said fuel cell;
    at least one of fuel-side condenser means of cooling an exhaust fuel gas discharged from said fuel cell to condense content water vapor contained in the exhaust fuel gas or oxidizer-side condenser means of cooling an exhaust oxidizer gas discharged from said fuel cell to condense content water vapor contained in the exhaust oxidizer gas;
    a condensed water tank that is opened to atmosphere and stores said condensed water provided by at least one of said fuel-side condenser means or said oxidizer-side condenser means; and
    a water discharge channel of discharging an excessive cooling water discharged from said cooling water tank to said condensed water tank,
    wherein said cooling water tank is opened to the air via said water discharge channel and said condensed water tank.

2. The fuel cell system according to claim 1, comprising:
    a water supply channel including water supply means of supplying water from said condensed water tank to said cooling water tank and water quality treatment means of adjusting the quality of the water supplied to said cooling water tank; and
    controller means of controlling at least an operation of said water supply means, and
    the water adjusted in quality by said water quality treatment means is supplied to said cooling water tank from said condensed water tank.

3. The fuel cell system according to claim 2, wherein said controller means activates said water supply means when starting and/or terminating the operation of the fuel cell system.

4. The fuel cell system according to claim 2, wherein said controller means includes:
    number-of-operations storage means of counting and storing a number of operations of the fuel cell system; and
    number-of-operations resetting means of resetting said stored number of operations to an initial condition, and
    said water supply means is activated when said number of operations stored in said number-of-operations storage means becomes larger than a certain number, and after the operation of said water supply means is terminated, said number of operations is reset by said number-of-operations resetting means.

5. The fuel cell system according to claim 2, wherein said controller means includes:
    operation time storage means of counting and storing an operation time of the fuel cell system; and
    operation time resetting means of resetting said stored operation time to an initial condition, and
    said water supply means is activated when said operation time stored in said operation time storage means becomes larger than a certain time, and after the operation of said water supply means is terminated, said operation time is reset by said operation time resetting means.

6. The fuel cell system according to claim 2, wherein said controller means includes water quality detecting means of detecting the quality of said cooling water, and
    said water supply means is activated when said water quality becomes worse than a predetermined first reference value, and said water supply means is stopped when said water quality becomes better than a predetermined second reference value during operation of said water supply means.

7. The fuel cell system according to claim 2, wherein an ion exchange resin is used as said water quality treatment means.

8. The fuel cell system according to any of claims 1 to 7, comprising:
    a water reservoir that has a water circulation channel, through which water intended for heat exchange with water which is cooler than the water in the reservoir and circulation channel, circulates, and stores said water; and
    a reverse osmosis membrane device.

9. The fuel cell system according to claim 8, wherein said reverse osmosis membrane device receives city water, separates the city water into purified water and condensed water, supplies said condensed water to said water reservoir, and supplies said purified water to said condensed water tank or said cooling water tank.

10. The fuel cell system according to claim 8, wherein said reverse osmosis membrane device receives said water from said water reservoir, separates the water into purified water and condensed water, returns said condensed water to said water reservoir, and supplies said purified water to said condensed water tank or said cooling water tank.

11. The fuel cell system according to claim 9, comprising:
    a bypass channel that directly interconnects an inlet port and a discharge port for said condensed water of said reverse osmosis membrane device; and
    a reverse osmosis membrane inlet-side channel control valve and/or a condensed water discharge-side channel control valve, the reverse osmosis membrane inlet-side channel control valve being provided at a branch point of the inlet port of said reverse osmosis membrane device and said bypass channel or at a position closer to said inlet port than the branch point, and the condensed water discharge-side channel control valve being provided at a branch point of said discharge port for the condensed water of said reverse osmosis membrane device and said bypass channel or at a position closer to said discharge port than the branch point, wherein said controller controls the reverse osmosis membrane inlet-side channel control valve and/or said condensed water discharge-side channel control valve to pass whole or part of the water passing through the said reverse osmosis membrane device through said bypass channel.

12. The fuel cell system according to claim 11, comprising: temperature detecting means of measuring the temperature of the water supplied to said reverse osmosis membrane device, wherein said controller controls to adjust a ratio of waters supplied to said bypass channel and said reverse osmosis membrane device based on the temperature measured with said temperature detecting means.

13. The fuel cell system according to claim 11, comprising booster means of increasing the pressure of the water that is provided in the inlet-side channel of said reverse osmosis membrane device.

14. The fuel cell system according to claim 11, comprising water amount measuring means of measuring the amount of water stored in said condensed water tank.

15. The fuel cell system according to claim 11, comprising flow rate measuring means of measuring the amount of water supplied from said condensed water tank to a reformer that supplies the fuel gas to said fuel cell.

16. The fuel cell system according to claim 11, comprising:

amount-of-electric-power-generation measuring means of measuring the amount of electric power generated by said fuel cell; and amount-of-collected-water estimating means of estimating, based on the detection value of said amount-of-collected-water estimating means, the amount of condensed water collected in said fuel-side condenser means and/or said oxidizer-side condenser means.

17. The fuel cell system according to claim 9, wherein said water reservoir has a discharge valve that discharges said water when the water purified in said reverse osmosis membrane device becomes insufficient.

18. A method of operating a fuel cell system comprising:
a fuel cell that generates electric power using a fuel gas and an oxidizer gas;
a cooling water tank that stores cooling water for cooling said fuel cell;
at least one of fuel-side condenser means of cooling an exhaust fuel gas discharged from said fuel cell to condense content water vapor contained in the exhaust fuel gas, or oxidizer-side condenser means of cooling an exhaust oxidizer gas discharged from said fuel cell to condense content water vapor contained in the exhaust oxidizer gas;
a condensed water tank that is opened to atmosphere and stores said condensed water provided by at least one of said fuel-side condenser means or said oxidizer-side condenser means; and
a water discharge channel of discharging an excessive cooling water discharged from said cooling water tank to said condensed water tank, wherein said cooling water tank is opened to the air via said water discharge channel and said condensed water tank, wherein the method comprises the steps of:

generating electric power in said fuel cell using said fuel gas and said oxidizer gas;

cooling said fuel cell with the cooling water in said cooling water tank;

with at least one of said fuel-side condenser means or oxidizer-side condenser means, providing condensed water by cooling at least one of the exhaust fuel gas or said exhaust oxidizer gas discharged from said fuel cell to condense the content water vapor; and storing said condensed water in said condensed water tank, and discharging an excessive cooling water discharged from said cooling water tank to said condensed water tank.

19. The method of operating a fuel cell system according to claim 18, wherein said fuel cell system comprises:

a water supply channel including water supply means of supplying water from said condensed water tank to said cooling water tank and water quality treatment means of adjusting the quality of the water supplied to said cooling water tank, and the method comprises a step of supplying the water adjusted in quality by said water quality treatment means to said cooling water tank from said condensed water tank.

20. The method of operating a fuel cell system according to claim 18 or 19, wherein said fuel cell system comprises a water reservoir having a water circulation channel intended for heat exchange with said cooling water and a reverse osmosis membrane device, and the method comprises the steps of:

supplying purified water to said cooling water tank and/or said condensed water tank through said reverse osmosis membrane device; and supplying the condensed water discharged from said reverse osmosis membrane device to said water reservoir.

* * * * *